(12) United States Patent
Erd

(10) Patent No.: US 7,905,049 B2
(45) Date of Patent: Mar. 15, 2011

(54) ALGAE PRODUCTION

(75) Inventor: Ronald A. Erd, Powell, OH (US)

(73) Assignee: Independence Bio-Products, Inc., Dublin, OH (US)

( * ) Notice: Subject to any disclaimer, the term of this patent is extended or adjusted under 35 U.S.C. 154(b) by 161 days.

(21) Appl. No.: 11/933,743

(22) Filed: Nov. 1, 2007

(65) Prior Publication Data

US 2009/0113790 A1 May 7, 2009

(51) Int. Cl.
*A01G 7/00* (2006.01)
*F28D 15/00* (2006.01)

(52) U.S. Cl. .......................... 47/1.4; 435/257.1

(58) Field of Classification Search ............... 47/1.01 R, 47/1.4, 58.1 R, 59 R, 60, 62 R, 62 A, 62 C, 47/62 E, 62 N; 119/224–229; 435/257.1–257.6
See application file for complete search history.

(56) References Cited

U.S. PATENT DOCUMENTS

| | | | | |
|---|---|---|---|---|
| 2,658,310 A * | 11/1953 | Cook | ................................. | 435/3 |
| 3,431,200 A * | 3/1969 | Davis et al. | .................... | 210/602 |
| 3,645,040 A | 2/1972 | Ort | | |
| 4,137,868 A * | 2/1979 | Pryor | ............................. | 119/212 |
| 4,235,043 A * | 11/1980 | Harasawa et al. | ................ | 47/1.4 |
| 4,258,661 A * | 3/1981 | Margen | ......................... | 119/229 |
| 4,267,038 A * | 5/1981 | Thompson | ..................... | 210/602 |
| 4,320,594 A * | 3/1982 | Raymond | ......................... | 47/1.4 |
| 4,910,912 A * | 3/1990 | Lowrey, III | ...................... | 47/62 R |
| 4,958,460 A * | 9/1990 | Nielson et al. | ..................... | 47/1.4 |
| 5,121,708 A * | 6/1992 | Nuttle | ............................ | 119/200 |
| 6,740,232 B1 * | 5/2004 | Beaulieu | ......................... | 210/151 |
| 6,923,906 B2 * | 8/2005 | Oswald et al. | ................. | 210/188 |
| 2002/0034817 A1 * | 3/2002 | Henry et al. | ................ | 435/257.1 |
| 2005/0239182 A1 * | 10/2005 | Berzin | ........................... | 435/166 |
| 2008/0009055 A1 * | 1/2008 | Lewnard | ........................ | 435/262 |
| 2008/0155890 A1 * | 7/2008 | Oyler | ................................ | 47/1.4 |

OTHER PUBLICATIONS

Highway or Country Road: Algal Recruitment With Distance From An Island Reef; Goldberg, et al., Journal of Marine Biology Ass. UK (2004), vol. 84, p. 84.*
Cultivation of Algae and Nutrient Removal in a Waste Heat Utilization Process, Wilde, et al., Journal of Applied Phycology (1991), vol. 3: pp. 159-167.*
Search Report issued in International Patent Application No. PCT/US2008/080674.
Highway or Country Road: Algal Recruitment With Distance From An Island Reef; Goldberg, et al., Journal of Mar. Biol. Ass. UK (2004), vol. 84, p. 84; ISSN 0025-3154.
Cultivation of Algae and Nutrient Removal in a Waste Heat Utilization Process, Wilde, et al., Journal of Applied Psycology (1991), vol. 3; pp. 159-167; retrieved from the Internet at http://www.springerlink.com/content/082761523326311).
GSPI Completes Algae to Biodiesel Winter Demo Testing; http://www.greenstarusa.com/news/08-08-3B.html; Mar. 25, 2008.
http://en.wikipedia.org/wiki/Algaculture; 12 pages; Jul. 23, 2007.

(Continued)

*Primary Examiner* — Rob Swiatek
*Assistant Examiner* — Danielle Clerkley
(74) *Attorney, Agent, or Firm* — Sci-Law Strategies, PC

(57) ABSTRACT

Methods and systems for algae production are provided, the methods and systems generally comprising providing at least one body of water having an algae population in suspension, growing algae, heating the body of water with a heat source, heating the algae process with a heat source, drying the algae with a heat source, and covering the body of water with a cover. Heat recovery systems, algae processing, and covers are also provided.

20 Claims, 16 Drawing Sheets

OTHER PUBLICATIONS

Biodiesel from microalgae—Research review paper; Y. Chisti; Biotechnology Advances 25 (2007) 294-306; Institute of Technology and Engineering, Massey University, Private Bag 11 222, Palmerston North, New Zealand; www.sciencedirect.com.

Microalgae, Mass Culture Methods; E. Molina Grima; University of Almeria; Almeria, Spain; pp. 1753-1769.

System design for the autotrophic production of microalgae; Kenneth L. Terry; Enzyme Microb. Technol., 1985, vol. 7, Oct.; pp. 474-487.

Bioreactors, Photo; Mario R. Tredici; University of Florence; Florence, Italy; pp. 395-419.

Recovery of microalgal biomass and metabolites: process options and economics; E. Molina Grima et al.; Biotechnology Advances 20 (2003) 491-515; www.sciencedirect.com.

Photobioreactors: production systems for photographic microorganisms; O. Pulz; Appl Microbiol Biotechnol (2001) 57:287-293; published online: Aug. 22, 2001.

Review: Commercial Applications of Microalge; P. Spolaore et al.; Journal of Bioscience and Bioengineering; vol. 101, No. 2, 87-96; 2006.

Modeling and Simulation of the Algae to Biodiesel Fuel Cycle—Honors Undergraduate Thesis Submitted to The College of Engineering Honors Committee; The Ohio State University; N. Sazdanoff; Winter 2006.

http://www.oakhavenpc.org/cultivating_algae.htm; Cultivating Algae for Liquid Fuel Production; Thomas F. Riesling, Ph.D.; 7 pages; Sep. 4, 2007.

http://www.unh.edu/p2/biodiesel/article_alge.html; Widescale Biodiesel Production from Algae; Michael Briggs; University of New Hampshire, Physics Department; (revised 2004); 8 pages; Sep. 4, 2007.

A Look Back at the U.S. Department of Energy's Aquatic Species Program: Biodiesel from Algae-Part I Program Summary.

Cultivation of algae and nutrient removal in a waste heat utilization process; Edward W. Wilde et al.; Journal of Applied Phycology 3: 159-167, 1991; Kluwer Academic Publishers, Printed in Belgium.

A process for high yield and scaleable recovery of high purity eicosapentaenoic acid esters from microalgae and fish oil; El Hassan Belarbi et al.; Department of Chemical Engineering, University of Almeria, E-0407 Almeria, Spain; Enzyme and Microbial Technology 26 (2000) 516-529.

System and Economic Analysis of Microalgae Ponds for Conversion of Co2 to Biomass; Final Report to the Department of Energy Pittsburgh Energy Technology Center Under Grant No. DE-FG22-93PC93204; Submitted by John R. Benemann et al.; pp. 1-201; Mar. 21, 1996.

Culturing Microalgae in Outdoor Ponds; Michael A. Borowitzka; pp. 205-2118; Algal Culturing Techniques, Chapter 14; Academic Press (2005).

http://www.youtube.com/watch?v=EnOSnJJSP5c (transcription attached); MIT Algae Photobioreactor.

* cited by examiner

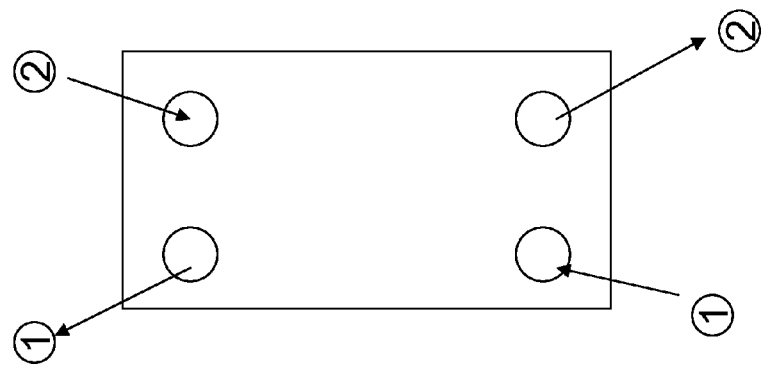
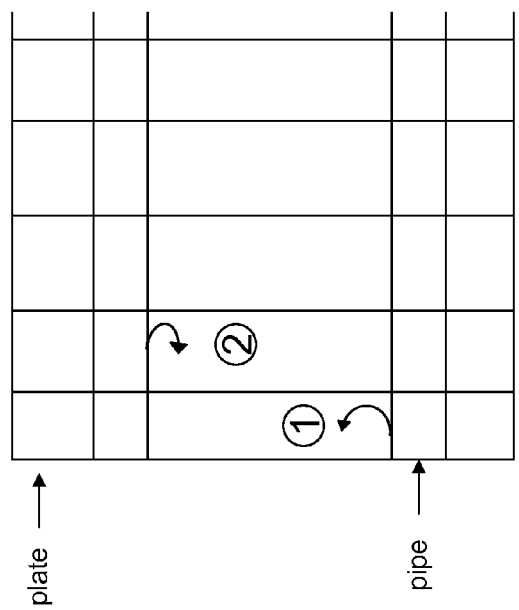
Fig. 12

ALGAE PRODUCTION

BACKGROUND

Commercial algae crops have been grown in temperate climates such as Hawaii, California, and Australia. These locations have been chosen due to the climate and associated algae growth benefits. In the seasonal colder regions where atmospheric and water temperatures fluctuate below ideal temperatures for algae production, algae production may not be economically maintained throughout the year. Even in the New Mexico desert, low night-time temperatures have had adverse effects on the growth of algae.

When algae are being cultivated or are reproducing, the temperature of the body of water or process has to be maintained within specific parameters day, night, and throughout the seasons of the year to achieve optimal productivity. Attempts have been made to control temperature with traditional sources of heat, including electric, natural gas, and propane. These attempts have been expensive and inefficient.

SUMMARY

In one embodiment, a method is provided for producing algae, the method comprising: providing at least one body of water having an algae population in suspension, wherein the body of water has an environment that is monitored for at least one of: nitrogen, nitrates, nitrogen containing substances, phosphorous, phosphates, phosphorous containing substances, potassium, potassium containing substances, silicon, silica, silicates, silicon containing substances, partial pressure of carbon dioxide, pH, temperature, and population density of the algae population in suspension; heating the body of water with a heat source; wherein the heat source comprises at least one of: a supply heat source, a recovered heat source, and a waste heat source from at least one of: a power plant, an industrial process, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, and a manufacturing plant; and growing the algae population.

In another embodiment, a method is provided for producing algae, the method comprising: processing algae with a heat source; wherein the heat source comprises at least one of: a supply heat source, a recovered heat source, and a waste heat source from at least one of: a power plant, an industrial process, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, and a manufacturing plant.

In yet another embodiment, a system is provided for heat recovery, the system comprising: at least one heat source; wherein the heat source comprises at least one of: a supply heat source, a recovered heat source, and a waste heat source from at least one of: a power plant, an industrial process, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, and a manufacturing plant; at least one heat consuming process; wherein the at least one heat consuming process is at least one of: a body of water with an algae in suspension, an algae drying process, an algae processing, an algae growing, an algae production, a photobioreactor; at least one heat transmitting device; and a plurality of fluid movers.

In another embodiment, a method is provided for producing algae, the method comprising: providing at least one body of water having an algae population in suspension, wherein the body of water has an environment that is monitored for at least one of: nitrogen, nitrates, nitrogen containing substances, phosphorous, phosphates, phosphorous containing substances, potassium, potassium containing substances, silicon, silica, silicates, silicon containing substances, partial pressure of carbon dioxide, pH, temperature, and population density of the algae in suspension; covering the body of water with a cover at least partially supported by a structure; and growing the algae population.

BRIEF DESCRIPTION OF THE DRAWINGS

In the accompanying drawings which are incorporated in and constitute a part of the specification, embodiments are illustrated which, together with the detailed description given below, serve to describe exemplary embodiments. It will be appreciated that the illustrated boundaries of elements (e.g. boxes, groups of boxes, or other shapes) in the figures represent but exemplary boundaries. One of ordinary skill in the art will appreciate, for example, that one element may be designed as multiple elements or that multiple elements may be designed as one element. In addition, one of ordinary skill in the art will appreciate that one component may be designed as multiple components or that multiple components may be designed as one component. One skilled in the art will also appreciate that one process or method may be designed with one order of components or that it may be designed with another order of components. An element shown as an internal component of another element may be implemented as an external component and vice versa. The drawings and components therein are not to any scale. Certain components may be omitted and others shown enlarged to facilitate understanding.

FIG. 12 illustrates a heat exchanger.

DETAILED DESCRIPTION

Figure 1:
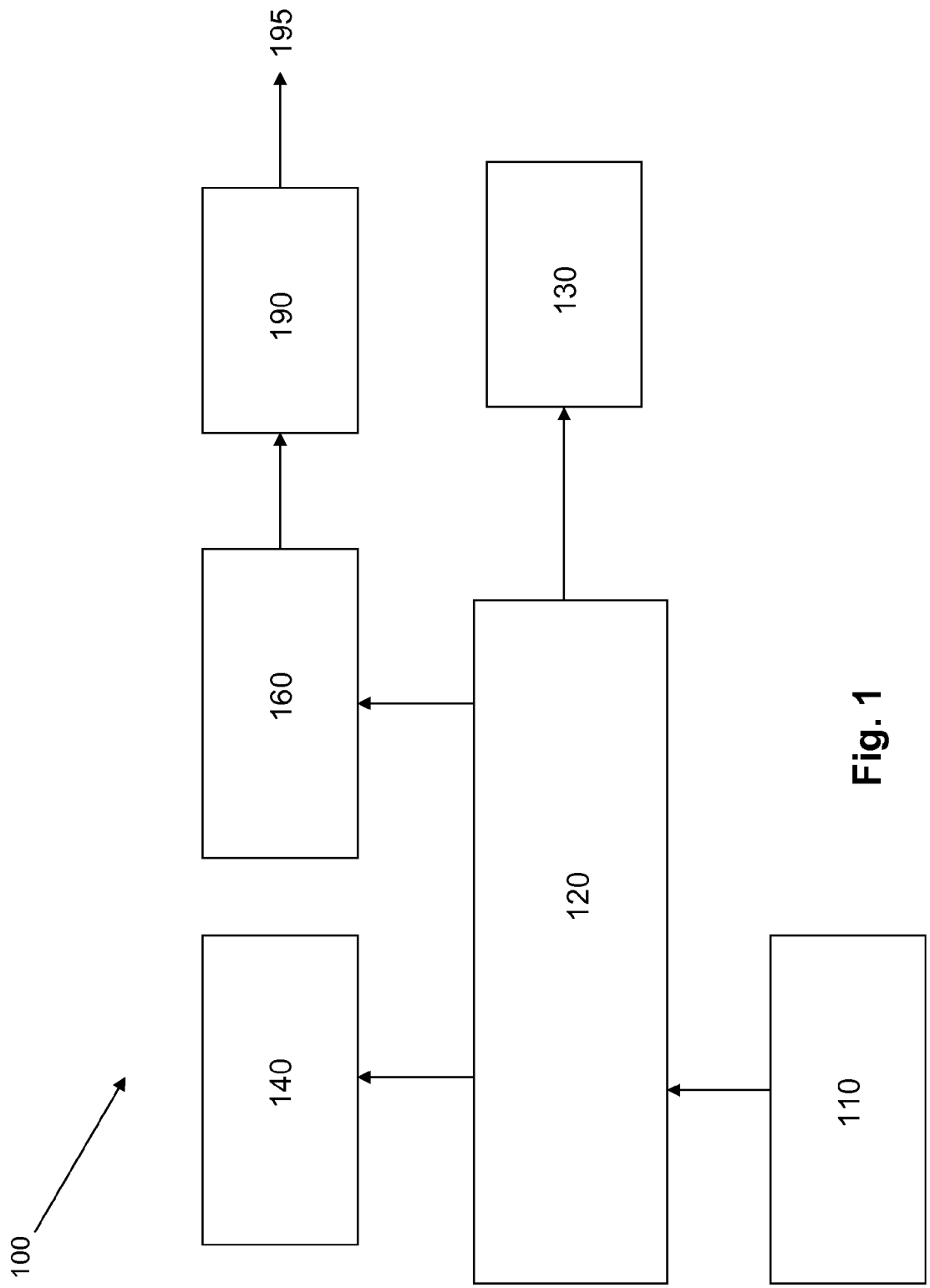
FIG. 1 is a schematic of an industrial process.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Algae processing" and "processing algae," as used herein, refers to the steps including harvesting the algae in suspension to the time of shipping the algae or algae derived products, and the like, which may include drying the algae.

"Algae production" and "producing algae," as used herein, refers to steps including growing algae and algae processing.

"Growing algae," "growing the algae," and "algae growth," as used herein, refers to the steps including algae in culture to when algae is in suspension just prior to the beginning of a harvesting step.

"Heat consuming process" and "heat consuming method," as used herein, refers to processes, methods, or entities that consume heat from a waste heat source, recovered heat source, or supply heat source, including at least one of: a body of water with algae in suspension, algae drying process, algae processing, processing algae, growing algae, algae production, a body of water with algae in suspension covered with a greenhouse, a body of water with algae in suspension covered with a cover, a body of water with algae in suspension without a cover, a photobioreactor covered with a cover, a photobioreactor without a cover, and the like.

"Heat source," as used herein, refers to at least one of: supply heat source, recovered heat source, waste heat source, and the like, from at least one of: a power plant, an industrial process, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, a manufacturing plant, and the like.

"Heat transfer device" as used herein, refers to one of the following: heat exchanger, a shell and tube heat exchanger, a plate heat exchanger, a regenerative heat exchanger, a fluid heat exchanger, a phase change heat exchanger, a parallel flow heat exchanger, a cross flow heat exchanger, a counter flow heat exchanger, a nozzle, an injector, a pump, a fan, a pipe, a condenser, a duct, cooling tower, air cooler, and the like.

"Recovered heat source," as used herein, refers to a source of heat that has been recovered from at least one of: a waste heat source and a supply heat source. The recovery can be accomplished either through a heat exchanger or directly.

"Supply heat source," as used herein, refers to a source of heat that is in its primary use or primary and secondary use, including steam directly from a boiler that is or can be made available to a point of use, hot air directly from a natural gas heater that is or can be made available to a point of use, and the like. The supply heat source can be in the form of at least one of: liquid, gas, vapor, steam, and the like and at least one of: elevated temperatures and elevated pressures.

"Waste heat output," as used herein, refers to discharge of heat from a waste heat source and the like.

"Waste heat source," as used herein, refers to industrial heat that is not used by an industrial process and the like, excluding exhaust stack gas.

One or more of the embodiments disclosed herein find application in heating algae production processes and methods that include algae in suspension in a body of water, in a photobioreactor, in a greenhouse, in algae processing, in processing algae, in growing algae, in algae production, and the like. Uses of the algae can be for the production of algae oil, beta carotene, nutritional supplements, nutritional ingredients in food, and an ingredient in animal food, solid fuel, liquid fuel, gaseous fuel, algae suspensions, and the like. Algae could be further processed to produce nutrients, fuel, biodiesel, algae-derived equivalent of petrochemicals, and the like.

Generally, several embodiments of a method or process are provided to use heat in heat consuming processes or methods. In such a method or process, heat from an industrial process may be used to maintain or increase the temperature of the body of water or process. The heat source from the industrial process can be a heat that would have been dispersed as waste into the environment, any other type of heat source, or any combination of heat sources. The heat consuming process may be using heat that would have been dispersed as waste into the environment and, thus as a recovered heat source, the cost of the energy source is less and the process or method is efficient and makes the production or method economically competitive in regions with less than ideal temperatures for optimal algae growth. In an alternative method or process, as a backup heat source, supplemental heat source, or alternative heat source, the heat consuming process or method uses a supply heat source instead of a waste heat.

FIG. 1 is a schematic of one embodiment illustrating a general industrial process 100 that has an input energy source 110, a production process 120, a product output 130, a supply heat source 140, a waste heat source 160, and a waste heat output 190 that is dispersed into the environment 195 surrounding the industrial process 100. The supply heat source 140 is a supply to a process or a method outside of production process 120. In another alternative embodiment (not shown), the supply heat source 140 is a supply to a process or a method inside of production process 120. The general industrial process 100 can be one of many industrial processes that discharge a waste heat output 190 into the environment 195, including: a power plant, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, a manufacturing plant, and the like. The supply heat source 140, waste heat source 160, and waste heat output 190 can be in various forms including: liquid, gas, vapor, and the like. In an alternative embodiment (not shown), there are multiple industrial processes 100. In another alternative embodiment (not shown), there are multiple supply heat sources 140. In yet another embodiment (not shown), there are multiple waste heat sources 160. In another alternative embodiment (not shown), there are multiple waste heat outputs 190. In another alternative embodiment (not shown), there is a combination of at least two heat sources, which may include: a supply heat source 140, a waste heat source 160, and a waste heat output 190. In yet another alternative embodiment (not shown), the heat source may not include exhaust stack gas.

Figure 2:
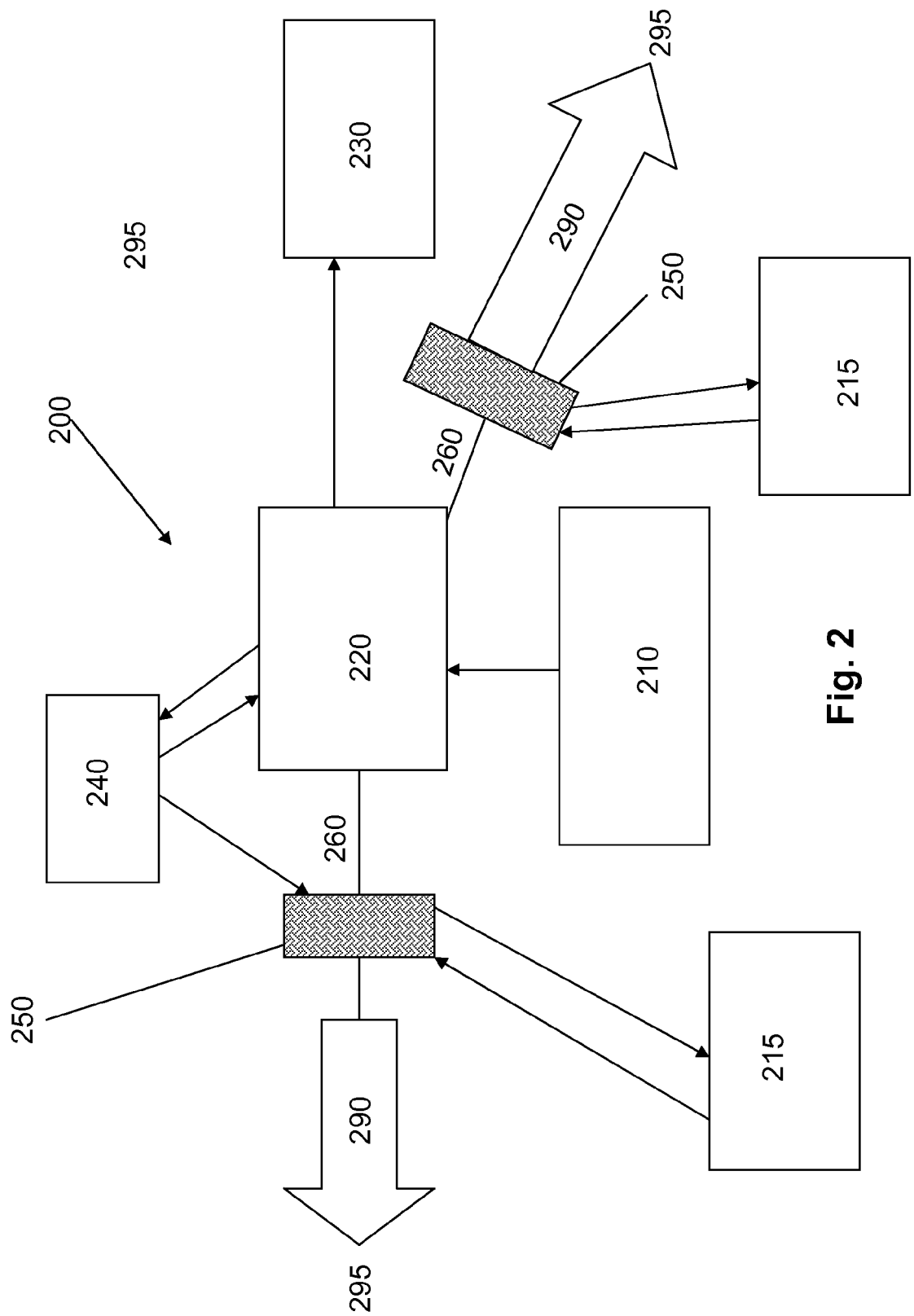
FIG. 2 is a schematic of an industrial process.

FIG. 2 is a schematic of one embodiment illustrating an industrial process 200 that has an input energy source 210, a production process 220, a product output 230, a supply heat source 240, a heat transfer device 250, a waste heat source 260, a waste heat output 290 that is dispersed into the environment 295 surrounding the industrial process 200, and a recovered heat source 215. The supply heat source 240 is a supply to a process or a method outside of production process 220. In an alternative embodiment (not shown), the supply heat source 240 is a supply to a process or a method inside of production process 220. The industrial process 200 is similar to the industrial process 100 in FIG. 1 above, but in addition, it has two heat transfer devices 250 and two recovered heat sources 215. In the illustrated embodiment, the two heat transfer devices 250 absorb heat from the waste heat source 260 and/or supply heat source 240 before the waste heat source 260 is dispersed into the environment and/or the supply heat source 240 is transferred to another point of use, producing a recovered heat source 215 and waste heat output 290. In an alternative embodiment (not shown), there is one heat transfer device 250 and one recovered heat source 215. In another alternative embodiment (not shown), there are more than two heat transfer devices 250 and more than two recovered heat sources 215. In yet another alternative embodiment (not shown), heat is recovered from a supply heat source 240 simultaneously while being transferred to another point of use. In another alternative embodiment (not shown), a supply heat source 240 may not be used by industrial process 200 but comes from another source. In another alternative embodiment (not shown), the recovered heat source 215 may be replaced with at least one of: a supply heat source 240, a waste heat source 260, and a recovered heat source 215. In yet another alternative embodiment (not shown), the heat source may not include exhaust stack gas.

Figure 3:
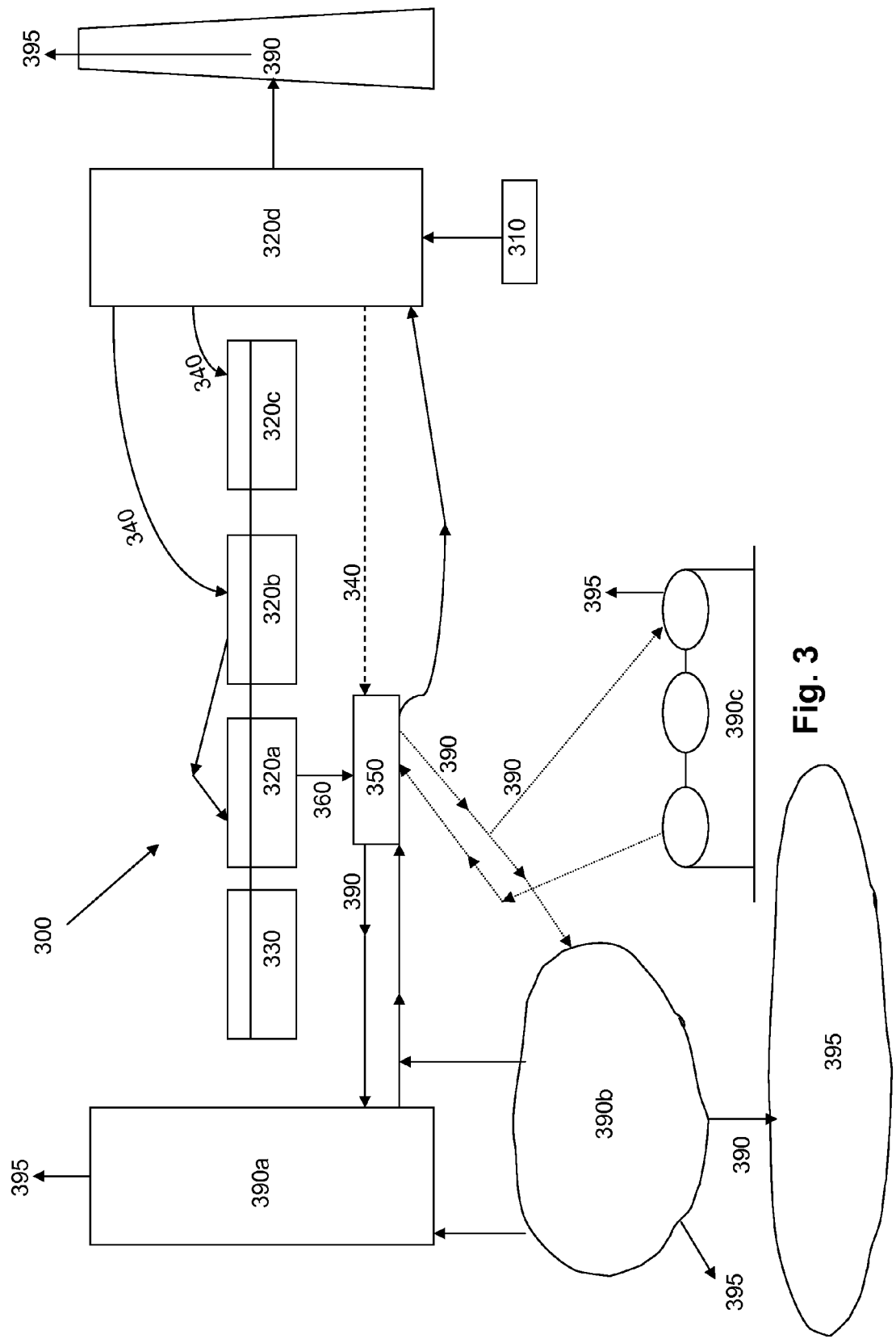
FIG. 3 illustrates an industrial process.

FIG. 3 is a schematic of one embodiment of an industrial process 300 that includes an input energy source 310, a production process that includes steps 320a-320d, a product output 330, a supply heat source 340, a heat transfer devices 350, a waste heat source 360, and waste heat outputs 390a-390c that are dispersed into the environment 395 surrounding the industrial process 300. In the illustrated embodiment, the industrial process 300 has one input energy source 310 that can include at least one of the following: coal, natural gas, propane, oil, butane, diesel, hazardous waste, biomass, refuse, paper, regenerative fuels, and the like. In an alternative embodiment (not shown), the industrial process 300 may have more than one input energy sources 310.

In the illustrated embodiment, the industrial process 300 has four production process steps 320a-320d. In an alternative embodiment (not shown), the industrial process 300 may have less than four production process steps. In yet another alternative embodiment (not shown), the industrial process 300 may have more than four production process steps. Further, in the illustrated embodiment, the industrial process 300 has one product output 330. In an alternative embodiment (not shown), the industrial process 300 may have more than one product output 330. Additionally, in the illustrated embodiment, the industrial process 300 has one supply heat source 340, sometimes known as the heat inflow into the process. In an alternative embodiment (not shown), the industrial process 300 may have more than one supply heat sources 340. In another alternative embodiment (not shown), the supply heat source 340 may encompass production process step 320d.

With continued reference to FIG. 3, the industrial process 300 has one heat transfer device 350. In an alternative embodiment (not shown), the industrial process 300 may have more than one heat transfer devices 350. In the illustrated embodiment, the industrial process 300 has three waste heat outputs 390a-390c that can include three of the following: water that may be at a higher temperature relative to the water (e.g. ocean, lake, river, pond, and the like) that it is dispersed into, hot water or steam which dissipates heat in a cooling tower, hot water or steam which dissipates heat in an air cooler that discharges warm air, and hot water vapor or steam dispersed from an industrial process. In an alternative embodiment (not shown), the industrial process 300 may have less than three waste heat outputs 390. In yet another alternative embodiments (not shown), the industrial process 300 may have more than three waste heat outputs 390.

Figure 4:
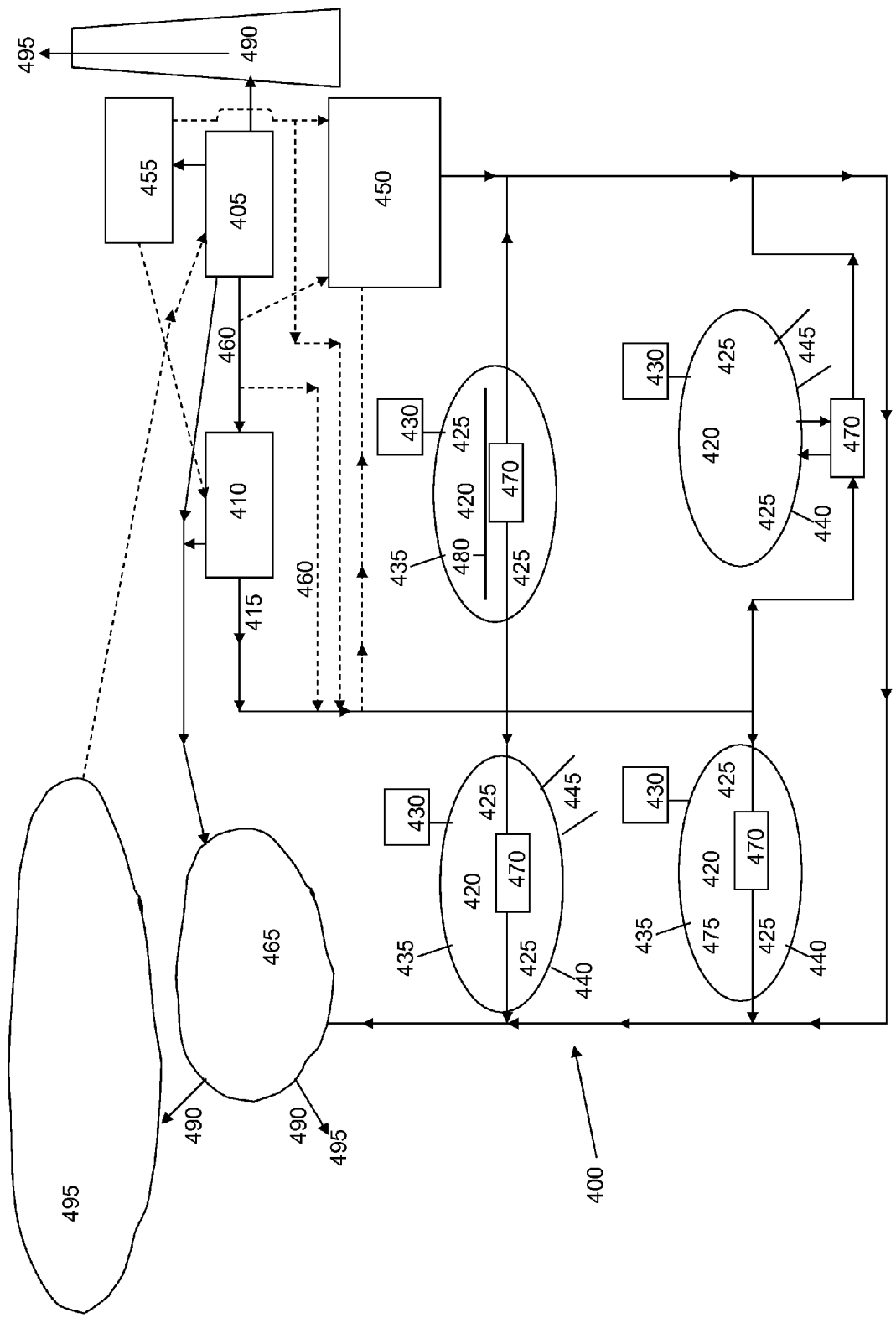
FIG. 4 illustrates an industrial process and algae production.

FIG. 4 is a schematic of one embodiment of algae production 400 that includes an industrial process 405, a heat transfer device 410, a recovered heat source 415, a body of water 420, an algae population 425, a body of water control/monitor 430, a cover 435, a liner 440, algae processing 450, a supply heat source 455, a waste heat source 460, an industrial process contained body of water 465, an environment 495 surrounding algae production 400, a heat transfer device 470 inside the body of water 420 or in the proximity of the body of water 420, a mixer 475, a center divider 480, and a waste heat output 490 that is dispersed to the environment 495. In yet another alternative embodiment, algae production 400 may include a harvesting system 445. The industrial process 405 can be one of many industrial processes that discharge a waste heat source 460 or supply heat source 455, including: a power plant, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, a manufacturing plant, and the like. In an alternative embodiment (not shown), there are multiple industrial processes 405. In an alternative embodiment (not shown), there is not an industrial process contained body of water 465. In an alternative embodiment (not shown), there are more than one industrial process contained bodies of water 465. In yet another alternative embodiment (not shown), heat transfer device 410 is not used in algae production 400.

With continued reference to FIG. 4, the supply heat source 455 and waste heat source 460 can be in various forms including: liquid, gas, vapor, steam, and the like. The dashed lines from supply heat source 455, from waste heat source 460, and to algae processing 450 represent alternative embodiments and configurations. In another alternative embodiment (supply heat source 455 shown as a dashed line), waste heat source 460 is the only heat source to heat transfer device 410. In another alternative embodiment (not shown), there are more than one supply heat sources 455. In yet another alternative embodiment (not shown), there are more than one waste heat sources 460. In another alternative embodiment (not shown), there are a combination of supply heat sources 455 and waste heat sources 460. In an alternative embodiment (not shown), the only input to heat transfer device 410 is a supply heat source 455. In another alternative embodiment (not shown), another form of heat is supplied to heat transfer device 410 including at least one of: supply heat source 455, waste heat source 460, and the like. In yet another embodiment (not shown), the heat source may not include exhaust stack gas.

In the illustrated embodiment, there is one heat transfer device 410. In an alternative embodiment (not shown), there is more than one heat transfer device 410. In the illustrated embodiment, one recovered heat supply 415 goes to the body of water 420. The recovered heat supply 415 may be transferred to the body of water 420 by a plurality of fluid movers, including a plurality of the following: a pump, a fan, a mixer, a pipe, a duct, an injector, a nozzle, a damper, and a valve. In an alternative embodiment (not shown), the plurality of fluid movers include at least one of: a supply heat system, a return heat system, a return of the heat-transfer medium following the heat transfer system, and a fluid mover by-pass. In an alternative embodiment (not shown), there is more than one recovered heat supply 415 that goes to the body of water 420. In another alternative embodiment (not shown), a waste heat source 460 may go directly to the body of water 420. In another alternative embodiment (not shown), a supply heat source 455 may go directly to the body of water 420. In yet another alternative embodiment (not shown), algae production 400 includes a cover 435 but lacks an outside heat source, including one of: a recovered heat supply 415, a supply heat source 455, and a waste heat source 460. In another alternative embodiment (not shown), algae production 400 does not include a cover 435 but includes an outside heat source, including one of: a recovered heat supply 415, a supply heat source 455, and a waste heat source 460.

With continued reference to FIG. 4, in the illustrated embodiment, four bodies of water 420 consume heat. In an alternative embodiment (not shown), there are less than four bodies of water 420. In another alternative embodiment (not shown), there are more than four bodies of water 420. In yet another alternative embodiment (not shown), algae production 400 includes at least one of: a body of water having an algae population in suspension, a photobioreactor, algae processing, growing algae, and an algae drying process. In another embodiment (not shown), algae production 400 may not include a photobioreactor. In the illustrated embodiment, the bodies of water 420 are all oval. In an alternative embodiment (not shown), the bodies of water 420 are in the shape of at least one of: a circle, an oval, an oval with a center island, an oval with a center divider, a raceway, a square, a rectangle, a trench, a trench that narrows toward the bottom, a rounded rectangle, a trapezoid, a triangle, a cross, a crescent moon shape, piping, and the like. In yet another alternative embodiment (not shown), the body of water 420 may not include a photobioreactor.

In the illustrated embodiment, an algae population 425 is within the body of water 420. In an alternative embodiment (not shown), the algae population 425 is within at least one of: a body of water having an algae population in suspension, a photobioreactor, algae processing, growing algae, and an algae drying process. In another alternative embodiment (not shown), the algae population is from at least one of: a local algae population, a foreign algae population, and a genetically modified algae. In yet another alternative embodiment (not shown), the algae population 425 may not be within a photobioreactor. Local algae populations are algae found in nature in less than or equal to one-hundred and fifty (150) miles from the algae production site. Foreign algae populations are algae found in nature outside one-hundred and fifty (150) miles from the algae production site or genetically modified algae.

In the illustrated embodiment, the body of water 420 that contains an algae population 425 is maintained by use of a body of water control/monitor 430. In the illustrated embodiment, the body of water 420 is being monitored and controlled for temperature by the body of water control/monitor 430. In an alternative embodiment (not shown), the body of water 420 is being monitored and controlled by the body of water control/monitor 430 for at least one of: nitrogen, nitrates, nitrogen containing substances, phosphorous, phosphates, phosphorous containing substances, potassium, potassium containing substances, silicon, silica, silicates, silicon containing substances, partial pressure of carbon dioxide, pH, temperature, and population density of the algae in suspension.

In the illustrated embodiment, the body of water 420 is heated with the recovered heat supply 415 by transmitting heat from hot gas to a heat transfer device 470 inside the body of water 420. In an alternative embodiment (not shown), the body of water 420 is heated with the recovered heat supply 415 by at least one of the following: hot gas to a heat exchanger located in the body of water that transmits heat into the body of water, hot gas to a heat exchanger located in proximity to the body of water that transfers heat to and into the body of water, hot gas injection into the body of water, hot vapor injection into the body of water, hot vapor to a heat exchanger in the body of water that transfers heat into the body of water, hot vapor to a heat exchanger located in proximity to the body of water that transfers heat to and into the body of water, hot liquid injection directly into the body of water, hot liquid transmitted to a heat exchanger located in the body of water that transfers heat into the body of water, hot liquid transmitted to a heat exchanger located in proximity to the body of water that transfers heat to and into the body of water, body of water fluid transmitted to a heat exchanger located in the industrial process that transfers heat to the body of water fluid which is then returned to the body of water, body of water fluid transmitted to a heat exchanger located in proximity to the industrial process that transfers heat to the body of water fluid which is then returned to the body of water, hot vapor transmitted to the body of water in a pipe or a duct that transfers heat into the body of water through the pipe or the duct, hot gas transmitted to the body of water in a pipe or a duct that transfers heat into the body of water through the pipe or the duct, and hot liquid transmitted to the body of water in a pipe or a duct that transfers heat into the body of water through the pipe or the duct. In the alternative embodiment where the heat transfer device 470 is located in proximity to the heat consuming process, further fluid transfer devices would be needed to transfer the heat from the heat exchanger to the body of water 420 or heat consuming process. In yet another embodiment (not shown), the body of water 420 is heated with the supply heat source 455 by at least one of the following: hot gas to a heat exchanger located in the body of water that transmits heat into the body of water, hot gas to a heat exchanger located in proximity to the body of water that transfers heat to and into the body of water, hot gas injection into the body of water, hot vapor injection into the body of water, hot vapor to a heat exchanger in the body of water that transfers heat into the body of water, hot vapor to a heat exchanger located in proximity to the body of water that transfers heat to and into the body of water, hot liquid injection directly into the body of water, hot liquid transmitted to a heat exchanger located in the body of water that transfers heat into the body of water, hot liquid transmitted to a heat exchanger located in proximity to the body of water that transfers heat to and into the body of water, body of water fluid transmitted to a heat exchanger located in the industrial process that transfers heat to the body of water fluid which is then returned to the body of water, body of water fluid transmitted to a heat exchanger located in proximity to the industrial process that transfers heat to the body of water fluid which is then returned to the body of water, hot vapor transmitted to the body of water in a pipe or a duct that transfers heat into the body of water through the pipe or the duct, hot gas transmitted to the body of water in a pipe or a duct that transfers heat into the body of water through the pipe or the duct, and hot liquid transmitted to the body of water in a pipe or a duct that transfers heat into the body of water through the pipe or the duct. In still another alternative embodiment (not shown), waste heat source 460 transmits heat to the body of water through a pipe, duct, or the like that runs through the body of water.

In the illustrated embodiment, the body of water 420 may be covered with a cover 435. The cover 435 is made of material that allows passage of light, the material that allows passage of light being one of: plastic, polymeric material, glass, acrylic, polycarbonate, and the like. In another embodiment (not shown), the cover 435 may be made of one of: polypropylene and polyethylene. In yet another embodiment (not shown), the cover 435 includes at least one of: insulation, single layer of covering, multiple layers of covering, multiple layers separated by an air or gas pocket of circulated or stagnant air or gas, an opening to allow heat removal, a vent for gaseous material removal, sections that can be removed from above the body of water, a retractable section, a removable panel, a roll-up section, and the like. In another embodiment (not shown), the cover 435 is of a construction including at least one of: gutter connected, free standing, round house, round house with sides, gothic arch, gothic arch with sides, cover with strapping, cover without strapping, floating cover, cover supported over a structure, and a cover supported over a divider. In another embodiment (not shown), the cover 435 is supported by one of: a structure, divider, and the like. In yet another embodiment (not shown), the support for the cover 435 is partially from one of: a structure and divider. In another embodiment (not shown), the structure that supports the cover 435 is made of earth, steel, plastic, glass, polymeric material, fiberglass, dirt, soil, rock, and the like. In yet another embodiment (not shown), the divider that supports the cover 435 is made of earth, steel, plastic, glass, polymeric material, fiberglass, dirt, soil, rock, and the like. In another embodiment (not shown), the cover 435 is over a photobioreactor with one of: supports and without supports. In yet another embodiment (not shown), the cover 435 is placed over a photobioreactor and the photobioreactor forms part of the structure that supports the cover 435. In another embodiment (not shown), algae production 400 does not have a cover 435.

With continued reference to FIG. 4, in the illustrated embodiment, the body of water 420 may have a liner 440 made from a geo-membrane material that lines the lower surface of the body of water 420. In an alternative embodiment (not shown), the liner 440 may be made from at least one of: a geo-membrane, plastic, polymeric material, rubber, synthetic rubber, fiberglass, cement, crushed stone, sand, clay, soil, and dirt. In yet another alternative embodiment (not shown), the body of water 420 may not have a liner 440.

In the illustrated embodiment, the algae population 425 in the body of water 420 may be harvested with a harvesting system 445 with nano-particle filters. In an alternative embodiment (not shown), the algae population 425 in the body of water 420 may be harvested with a harvesting system 445 that includes at least one of: a nano-particle filter, a skimmer, a centrifuge, a vacuum, dissolved air flotation, a mechanical press, and a pump.

In the illustrated embodiment, after the algae population 425 is grown and then may be harvested with the harvesting system 445, the algae may be transferred to algae processing 450, may be dried with the recovered heat source 415, and then may be further processed. In another alternative embodiment (not shown), the algae is dried in algae processing 450 with at least one of: a recovered heat source 415, a supply heat source 455, and a waste heat source 460. In yet another alternative embodiment (not shown), the algae is dried in algae processing 450 with a backup heat source including at least one of: a recovered heat source 415, a supply heat source 455, a waste heat source 460 and the like from the industrial process 405 or steam heat from an algae production process 400. In the illustrated embodiment, the recovered heat supply 415 is returned to the environment 495 after algae production 400 consumes the heat. In another alternative embodiment (not shown), some or all of the recovered heat supply 415 is returned back to the at least one of: industrial process 405, heat transfer device 410, and environment 495. In yet another alternative embodiment (not shown), the environment 495 may include at least one of: air, water, earth, and underground. The algae production of FIG. 4 may contain any or all of the disclosed embodiments and disclosed alternative embodiments of FIGS. 1-3 discussed above and FIGS. 5-10 discussed below.

Figure 5:
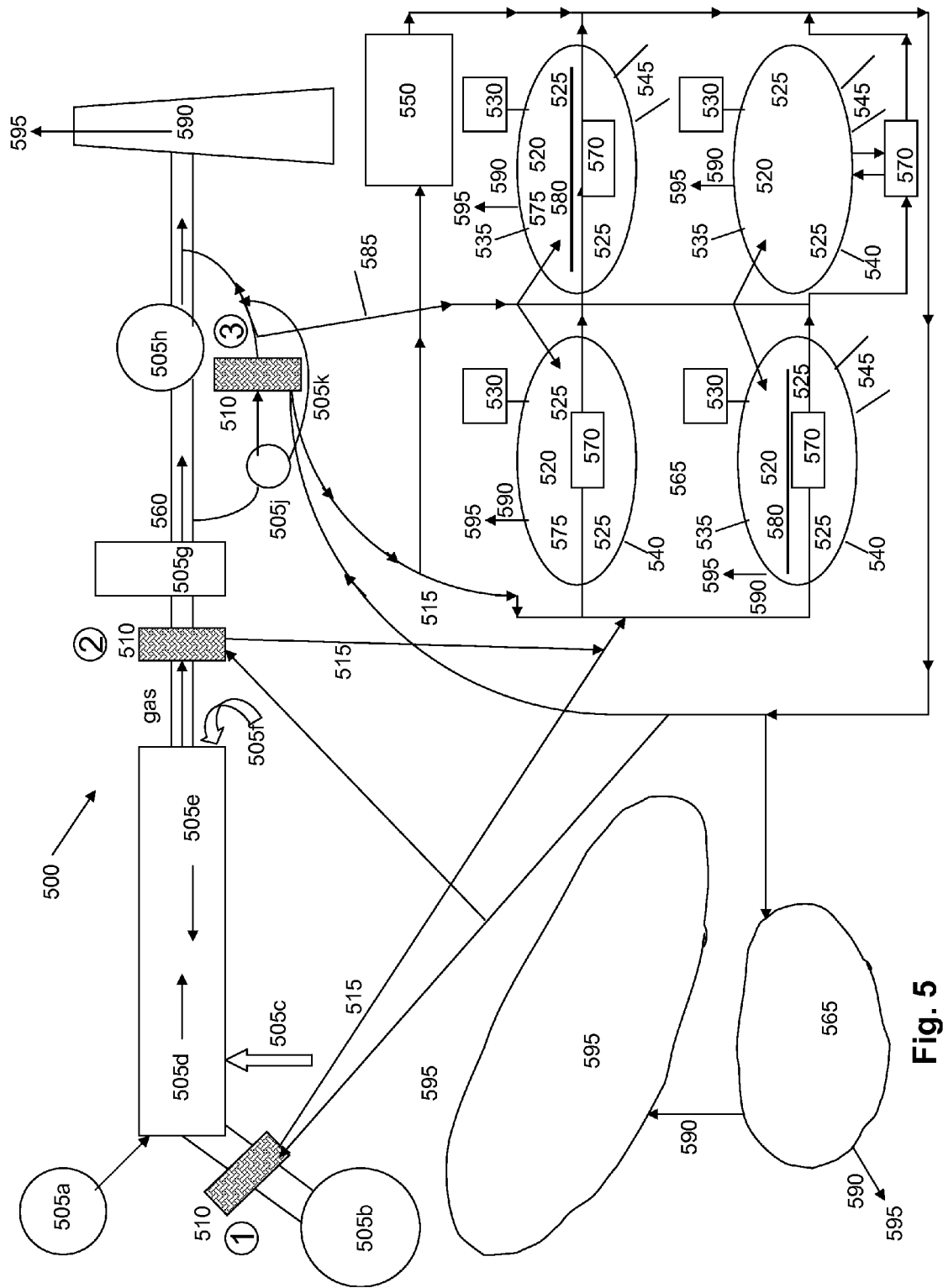
FIG. 5 illustrates an industrial process and algae production.

FIG. 5 is a schematic of one embodiment of algae production 500 that includes an industrial process 505, a heat transfer device 510, a recovered heat source 515, a body of water 520, an algae population 525, body of water controls/monitors 530, a cover 535, a liner 540, a harvesting system 545, algae processing 550, a supply heat source 555 (not shown), a waste heat source 560, an industrial process contained body of water 565, an environment 595 surrounding algae production 500, a heat exchanger 570, a mixer 575, center divider 580, a waste heat output 590 that is dispersed to the environment 595, and a $CO_2$ rich exhaust gas source combined with hot gas 585. In the illustrated embodiment, the industrial process 505 is a kiln cement process with industrial process steps 505a-505k. In the illustrated embodiment, the heat exchange bypass process 505j adds flexibility to the system to allow the operator of the industrial process 505 to turn the heat transfer device 510 on or off. If the heat transfer device 510 is on, then waste heat source 560 goes through heat transfer device 510. If the heat transfer device 510 is off, then waste heat source 560 goes through the bypass 505k. In the illustrated embodiment, the industrial process 505 has three heat transfer devices 510, labeled 1, 2, and 3. In another embodiment (not shown), there are less than three heat transfer devices 510. In yet another embodiment (not shown), there are more than three heat transfer devices 510. In yet another alternative embodiment, algae production 500 may not include a harvesting system 545. The illustrated embodiment includes a mixer 575 and a center divider 580 in one body of water 520. In another embodiment, a mixer 575 or a center divider 580 are in at least one body of water 520. In another embodiment, the mixer 575 and a center divider 580 are not in a body of water 520. In another embodiment, the mixer 575 or a center divider 580 are not in a body of water 520. In the illustrated embodiment, a $CO_2$ rich exhaust gas source combined with hot gas 585 is piped into the algae production 500 before being dispersed into the environment 595. In an alternative embodiment (not shown), the $CO_2$ rich exhaust gas source combined with hot gas 585 is not part of algae production 500.

With continued reference to FIG. 5, the cover 535 may include at least one of: insulation, single layer of covering, multiple layers of covering, multiple layers separated by a gas or air pocket of circulated or stagnant gas or air, an opening to allow heat removal, a vent for gaseous material removal, sections that can be removed from above the body of water, a retractable section, a removable panel, a roll-up section, and the like. In another embodiment (not shown), the cover 535 is of a construction at least one of: gutter connected, free standing, round house, round house with sides, gothic arch, gothic arch with sides, cover with strapping, cover without strapping, floating cover, cover draped over a divider, and the like.

In another embodiment (not shown), a divider is the only structure that supports the cover 535. In yet another embodiment (not shown), the cover may be supported by a structure. In another embodiment (not shown), a center divider is part of the structure that supports the cover 535. In another embodiment (not shown), the cover 535 is not part of algae production 500.

In the illustrated embodiment, the body of water 520 may have a liner 540 made from a geo-membrane material that lines the lower surface of the body of water 520. In an alternative embodiment (not shown), the liner 540 is made from at least one of: a geo-membrane, plastic, polymeric material, rubber, synthetic rubber, fiberglass, cement, crushed stone, sand, clay, and dirt. In yet another alternative embodiment (not shown), the body of water 520 does not have a liner 540. The algae production of FIG. 5 may contain any or all of the disclosed embodiments and disclosed alternative embodiments of FIGS. 1-4 discussed above and FIGS. 6-10 discussed below.

Figure 6:
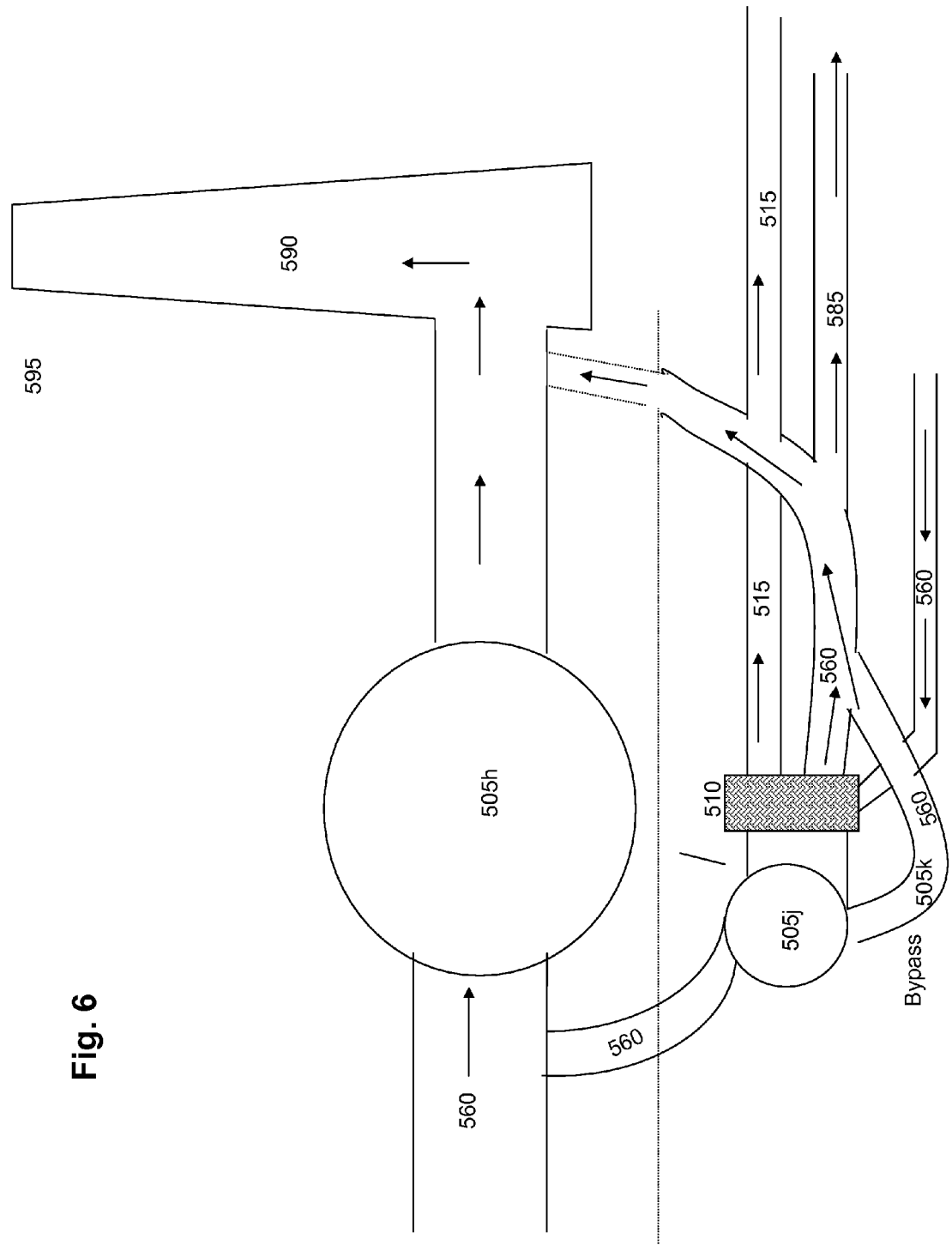
FIG. 6 illustrates a section of the industrial process and algae production from FIG. 5.

FIG. 6 is an enlarged schematic sectional view of the heat transfer device 510 including a secondary fan 505$j$ and a by-pass 505$k$, of one embodiment of algae production in conjunction with an industrial process 505 in FIG. 5, discussed above. The sectional view shows a primary exhaust fan 505$h$, a secondary by-pass fan 505$j$, a heat transfer device 510, a waste heat source 560, a waste heat output 590, a $CO_2$ supply with hot gas 585, and a return waste heat source 560. The illustrated embodiment shows how waste heat source 560 can either be directed through primary fan 505$h$ to the waste heat output 590 or be directed to secondary by-pass fan 505$j$ where the waste heat source 560 can be directed to the heat transfer device 510 or to the by-pass 505$k$ where the waste heat source 560 is sent to the industrial waste heat output 590 and dispersed to environment 595, rather than the algae process. In an alternative embodiment (not shown), waste heat source 560 can flow to both 505$h$ and 505$j$ in what is sometimes known as a split stream or slip stream. In the illustrated embodiment, there is one heat transfer device 510 and one by-pass 505$k$. In alternative embodiments (not shown), there are more than one heat transfer devices 510 and more than one by-passes 505$k$. In another embodiment (not shown), the waste heat source 560 is dispersed back to algae production 500. In an alternative embodiment (not shown), there is no secondary by-pass fan 505$j$. In yet another alternative embodiment (not shown), the waste heat source 560 and $CO_2$ rich exhaust gas source combined with hot gas 585 are combined in one output. In still another embodiment (not shown), the $CO_2$ rich exhaust gas source combined with hot gas 585 comes from a location after primary fan 505$h$. In yet another embodiment (not shown), the $CO_2$ rich exhaust gas source combined with hot gas 585 comes from an area further upstream of primary fan 505$h$. In yet another embodiment (not shown), the piping configuration varies but still achieves the purpose embodied in FIG. 6.

Figure 7:
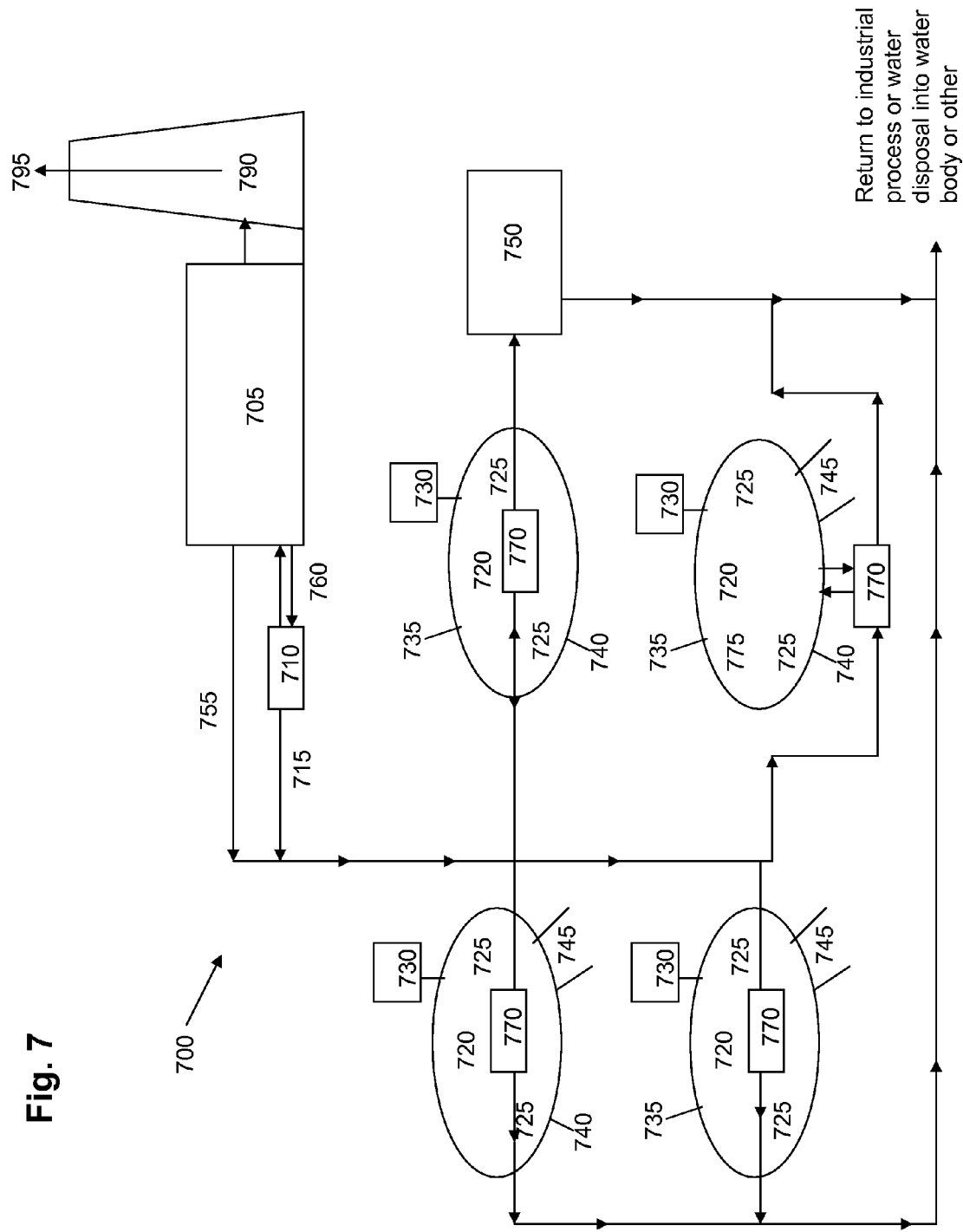
FIG. 7 illustrates an industrial process and algae production.

FIG. 7 is a schematic of one embodiment of algae production 700 that includes an industrial process 705. The algae production 700 is similar to the algae production 400, discussed above in FIG. 4, including having a heat transfer device 710, a recovered heat source 715, a body of water 720, an algae population 725, a body of water control/monitor 730, a cover 735, a liner 740, a harvesting system 745, algae processing 750, a supply heat source 755, a waste heat source 760, a waste heat output 790, an environment 795 surrounding algae production 700, and a heat transfer device 770 inside the body of water 720 or in proximity to the body of water 720. In the illustrated embodiment, the industrial process 705 is a power plant that supplies heat in the form of hot water or steam as supply heat source 755 or waste heat source 760. In another embodiment (not shown), the industrial process 705 can be at least one of: a power plant, an industrial process, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, a manufacturing plant, and the like. In the illustrated embodiment, after the body of water 720 absorbs the heat from the recovered heat source 715 transferring medium via the heat transfer device 770, then the cooled recovered heat source 715 is returned to the industrial process 705 or is dispersed into the environment 795. The algae production of FIG. 7 may contain any or all of the disclosed embodiments and disclosed alternative embodiments of FIGS. 1-6 discussed above and FIGS. 8-10 discussed below.

Figure 8:
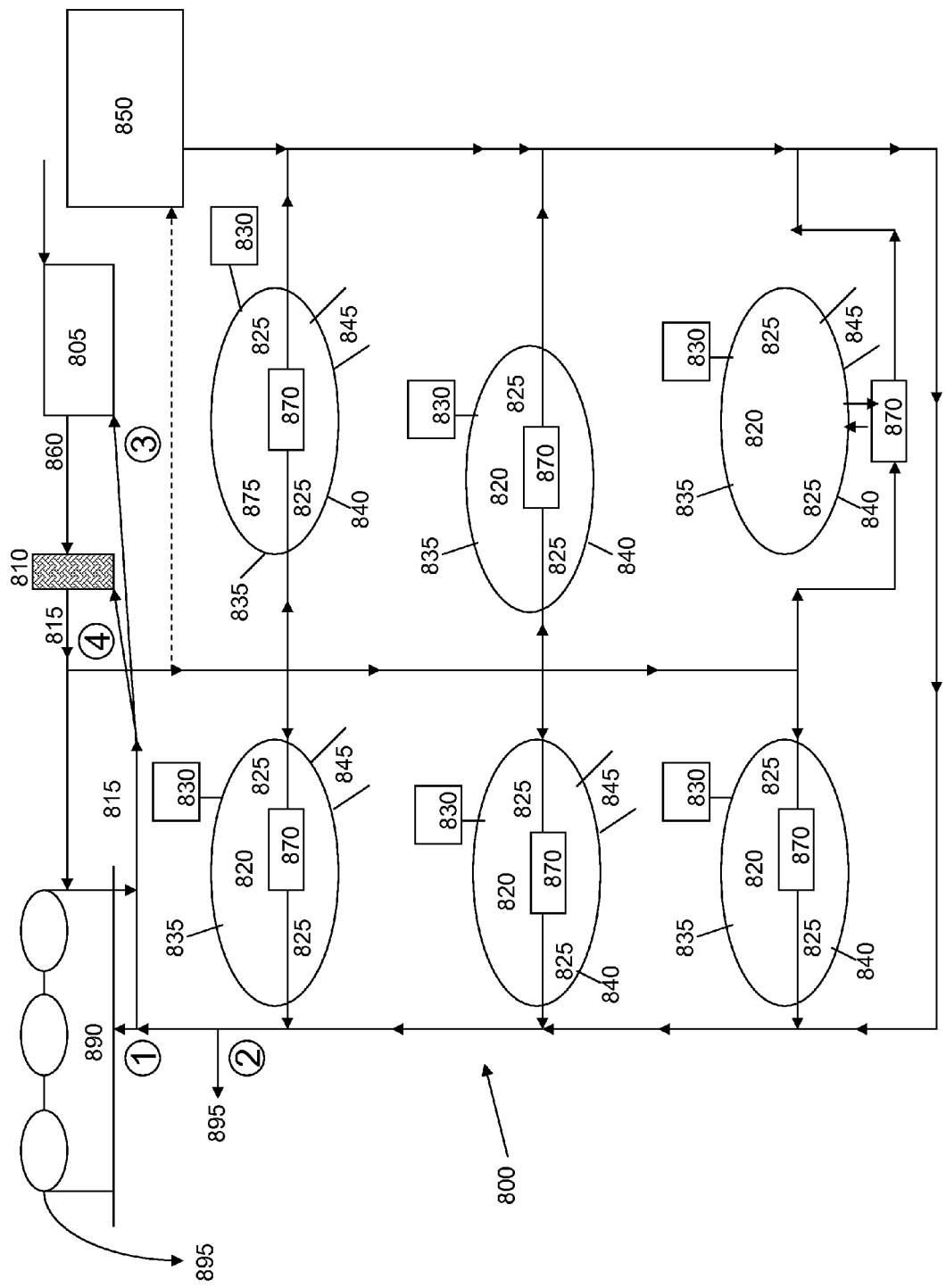
FIG. 8 illustrates an industrial process and algae production.

FIG. 8 is a schematic of one embodiment of algae production 800 that includes an industrial process 805. The algae production 800 is similar to algae production 400, discussed above in FIG. 4, including having a heat transfer device 810, a recovered heat supply 815, a body of water 820, an algae population 825, a body of water control/monitor 830, a cover 835, a liner 840, a harvesting system 845, algae processing 850, a supply heat source 855 (not shown), a waste heat source 860, a waste heat output 890 that removes waste heat from the industrial process to an environment 895 that surrounds the algae production 800, and a heat transfer device 870 inside the body of water 820. In the illustrated embodiment, the waste heat output 890 is an air cooler that removes waste heat from waste heat source 860, if not recovered by the heat transfer device 810 in the form of a recovered heat supply 815. In the illustrated embodiment, the waste heat source 860 is transferred to the heat transfer device 810 and then can either go to one of several bodies of water 820 where the water absorbs the recovered heat through heat transfer device 870 or it can be dispersed to the environment 895 through waste heat output 890. In the illustrated embodiment, on the return loop, depending on operating conditions of the industrial process 805, recovered heat supply 815 can take four paths, labeled 1, 2, 3, and 4, including one of: dispersed to the environment 895 through the waste heat output 890, returned directly to the environment 895, returned back to the industrial process 805, and returned back to the heat transfer device 810 where it will absorb more waste heat energy. In another embodiment (not shown), the algae production 800 is supplied with heat from a supply heat source 855. In another illustrated embodiment, the waste heat output 890 is one of: an air cooler, a water tower, an exhaust stack, a cooling tower, a heat sink, and the like. The algae production of FIG. 8 may contain any or all of the disclosed embodiments and disclosed alternative embodiments of FIGS. 1-7 discussed above and FIGS. 9-10 discussed below.

Figure 9:
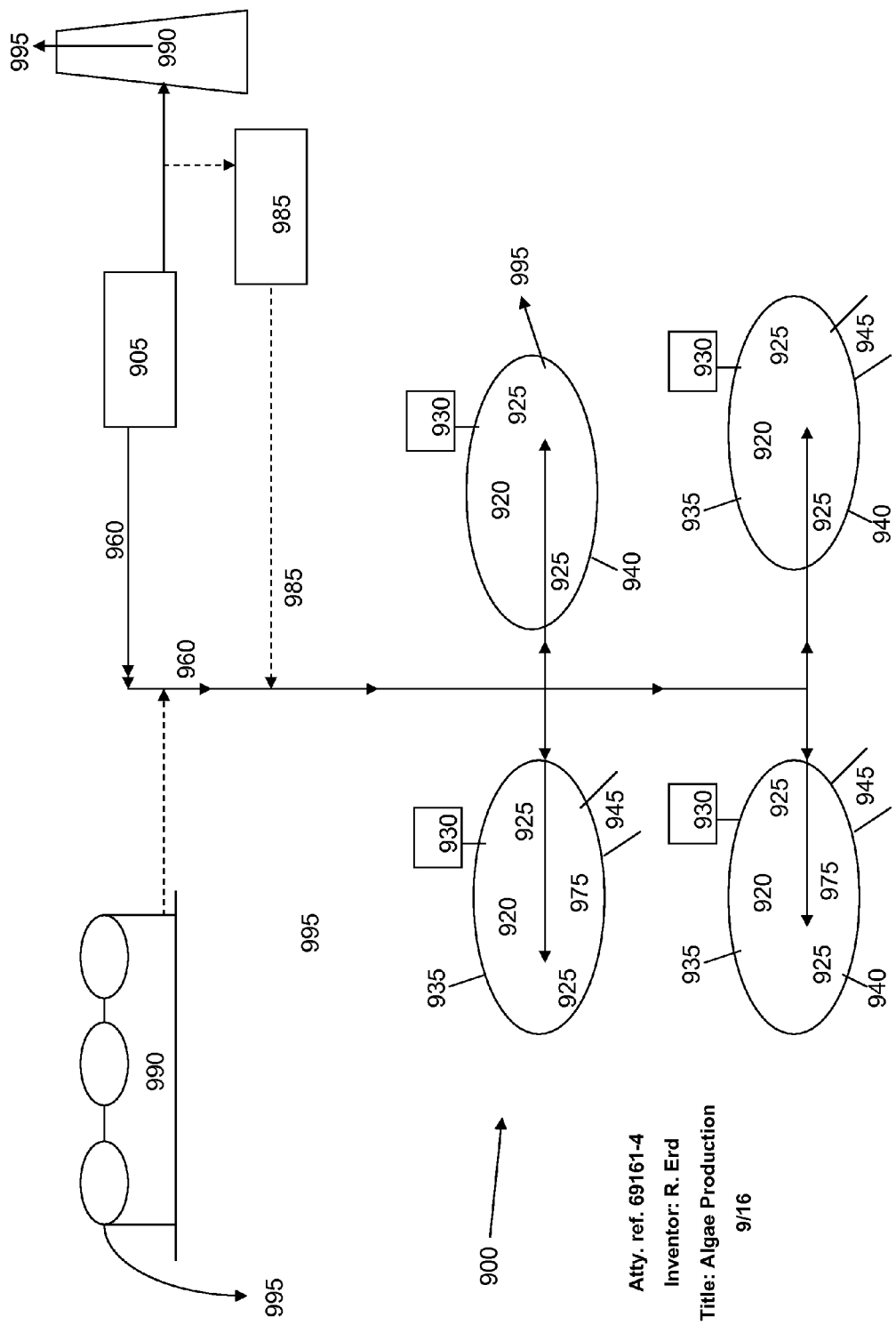
FIG. 9 illustrates an industrial process and algae production.

FIG. 9 is a schematic of one embodiment of algae production 900 that includes an industrial process 905. The algae production 900 is similar to the algae production 800, discussed above in FIG. 8, including having a body of water 920, an algae population 925, a body of water control/monitor 930, a cover 935, a liner 940, a harvesting system 945, algae processing 950 (not shown), a supply heat source 955 (not shown), a waste heat source 960, a waste heat output 990, an environment 995 surrounding the algae production 900.

In the illustrated embodiment, the waste heat source 960 is warm air, vapor, gas, water, or steam that is transferred to the location of the body of water 920 and algae population 925, then directly injected into the body of water 920. In an alternative embodiment (as shown with dotted lines), the waste heat source 960 is combined with a $CO_2$ exhaust supply combined with hot gas or vapor 985 and then injected into the body of water 920. In yet another embodiment, hot air from a waste heat output 960 is mixed with an industrial exhaust stream containing $CO_2$ exhaust supply combined with hot gas or vapor 985 and then injected into the body of water 920. In the illustrated embodiment, since the waste heat source 960 is injected into the body of water 920, there is no return loop back to the industrial process 905. In yet another alternative embodiment (not shown), since the waste heat source 960 is injected into the one body of water 920, there is a return loop from 920 into an industrial process contained body of water 965. In another embodiment (not shown), the algae production 900 is supplied with heat from a supply heat source 955. In another embodiment (not shown), the waste heat output 990 is at least one of: an air cooler, a water tower, an exhaust stack, a cooling tower, a heat sink, and the like. The algae production of FIG. 9 may contain any or all of the disclosed embodiments and disclosed alternative embodiments of FIGS. 1-8 discussed above and FIG. 10 discussed below.

Figure 10:
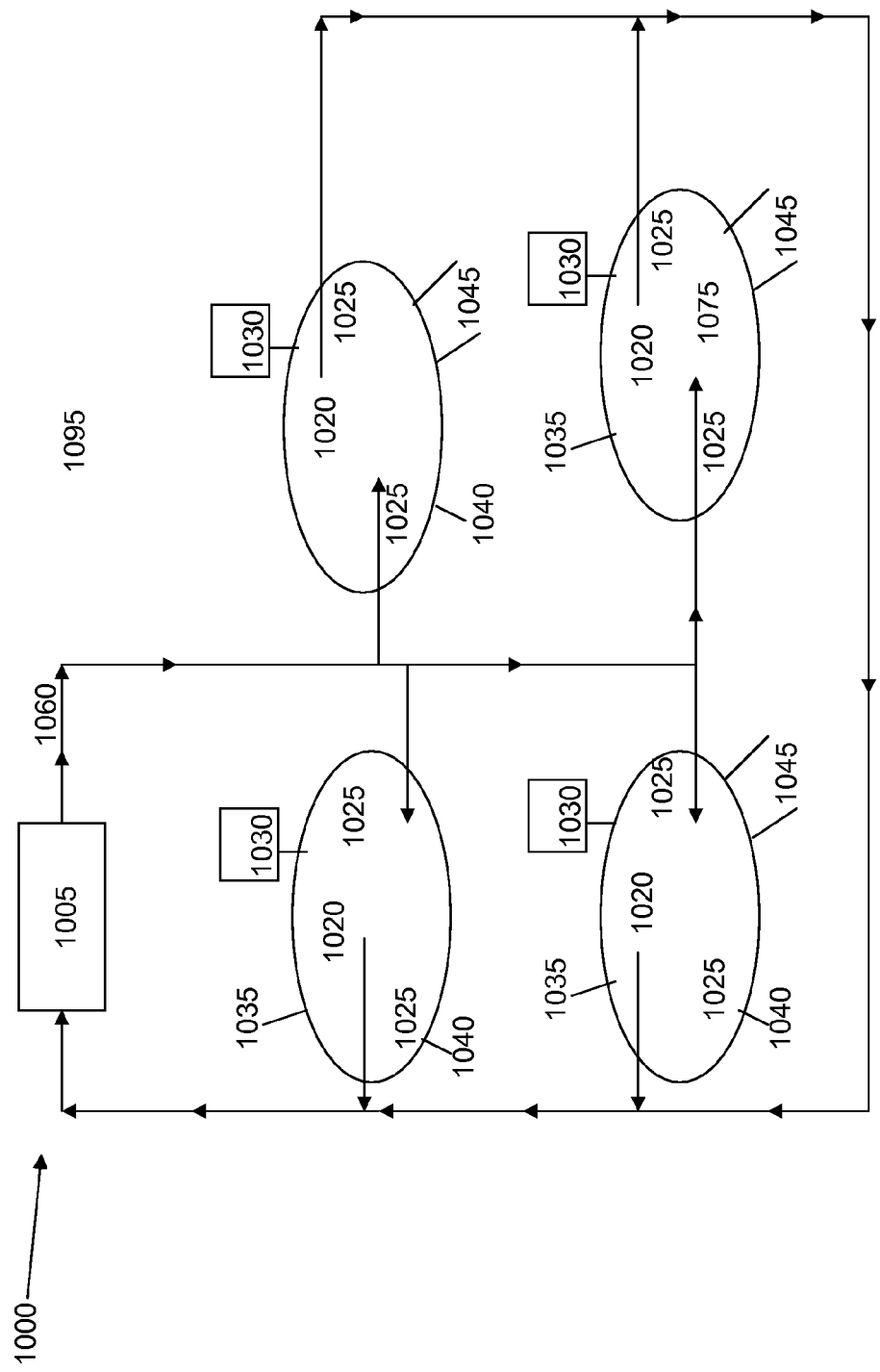
FIG. 10 illustrates an industrial process and algae production.

FIG. 10 is a schematic of one embodiment of algae production 1000 that includes an industrial process 1005. The algae production 1000 is similar to the algae production 400, discussed above in FIG. 4, including having a body of water 1020, an algae population 1025, a body of water control/monitor 1030, a cover 1035, a liner 1040, a harvesting system 1045, algae processing 1050 (not shown), a supply heat source 1055 (not shown), a waste heat source 1060, a waste heat output 1090 (not shown), an environment 1095 surrounding the algae production 1000. In the illustrated embodiment, the waste heat source 1060 is warm water that is injected directly into the body of water 1020 and algae population 1025. Further, illustrating the same embodiment, water from the body of water 1020 is then circulated back to the industrial process 1005 where more heat is absorbed from the industrial process 1005 and returned to the body of water 1020 as a waste heat source 1060. In another embodiment (not shown), the liquid from the body of water 1020 is used in combination with an alternative water source. In another embodiment (not shown), only an alternative water source is used. In another embodiment (not shown), algae production 1000 is supplied with heat from a supply heat source 1055. In another illustrated embodiment, the waste heat output 1090 is one of: an air cooler, a water tower, an exhaust stack, a cooling tower, a heat sink, and the like. In an alternative embodiment (not shown), the waste heat source 1060 is combined with a $CO_2$ exhaust supply and hot gas 1085 and then injected into the body of water 1020. The algae production of FIG. 10 may contain any or all of the disclosed embodiments and disclosed alternative embodiments of FIGS. 1-9 discussed above.

Figure 11:
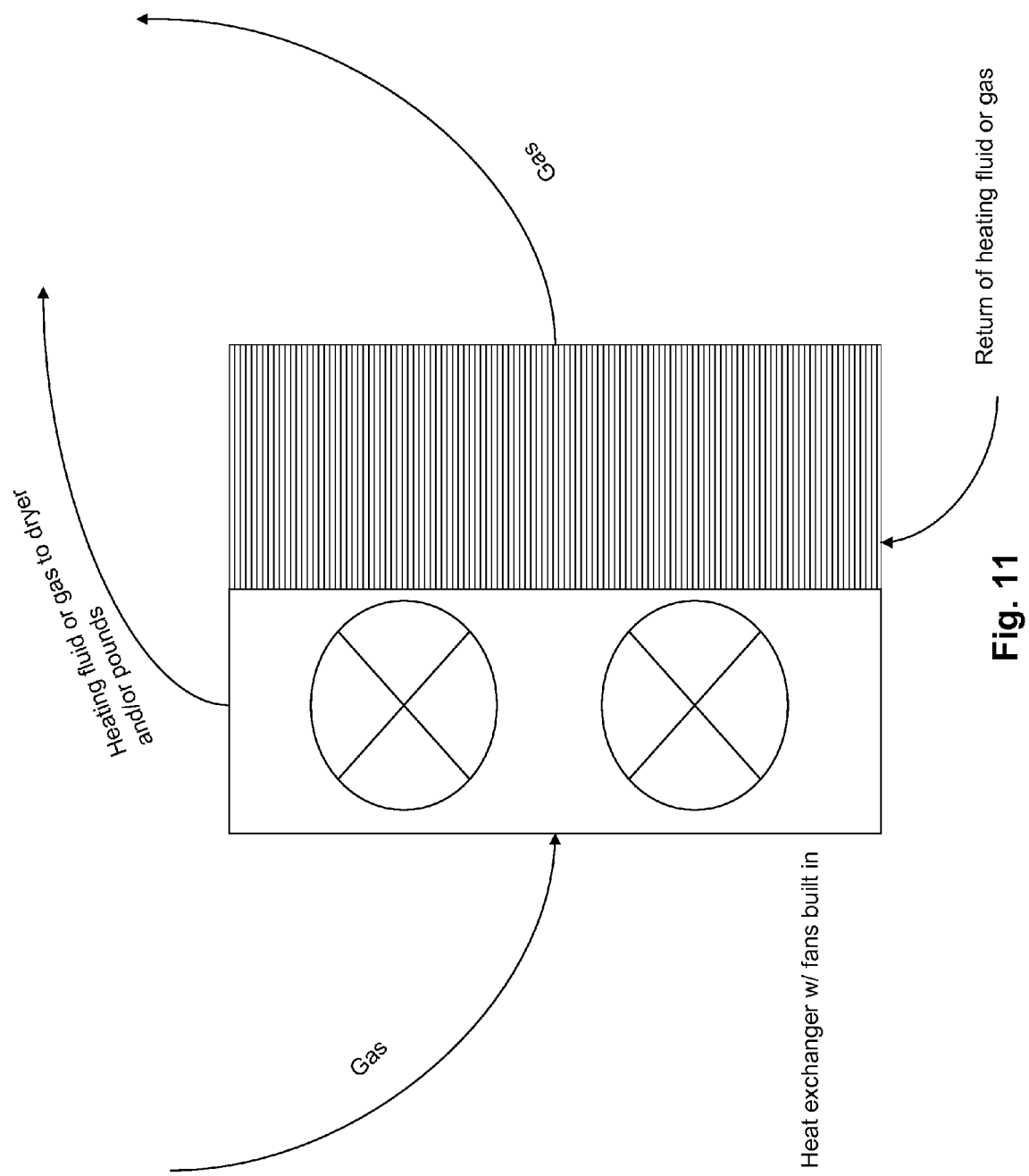
FIG. 11 illustrates a heat exchanger.
Figure 13:
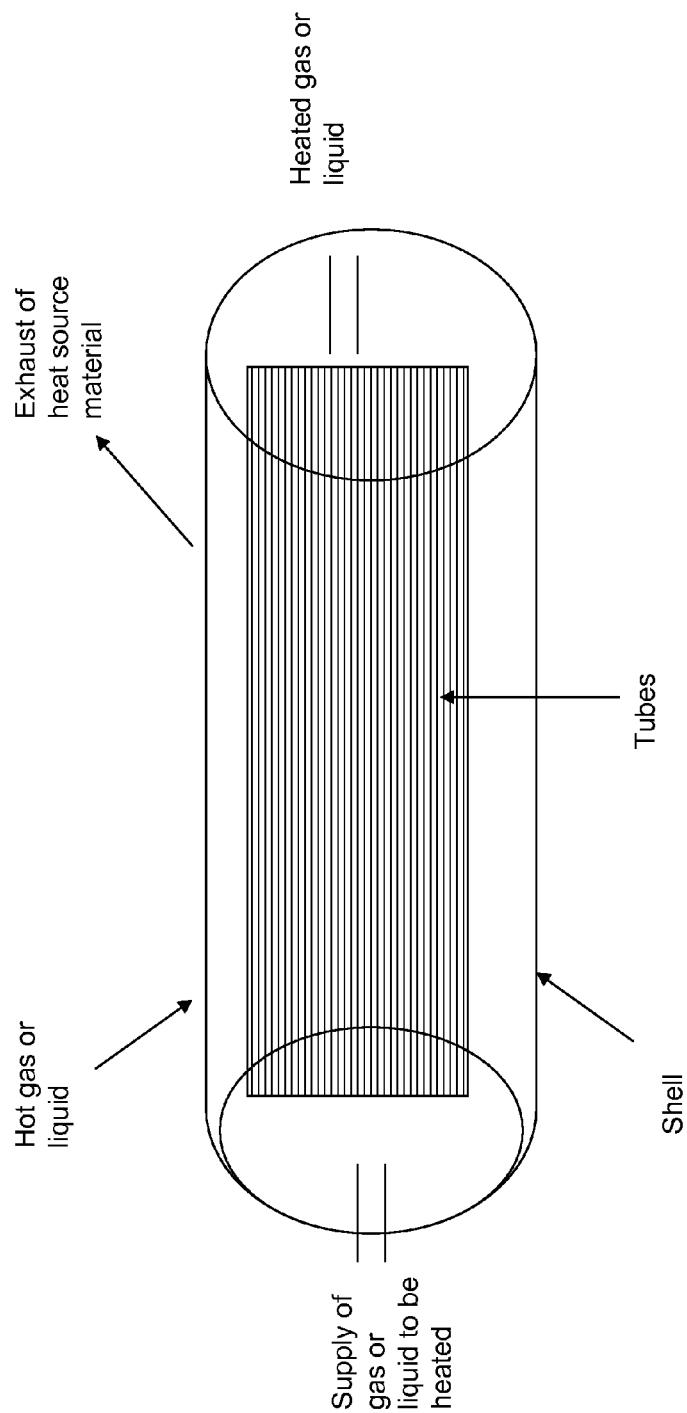
FIG. 13 illustrates a heat exchanger.
Figure 14:
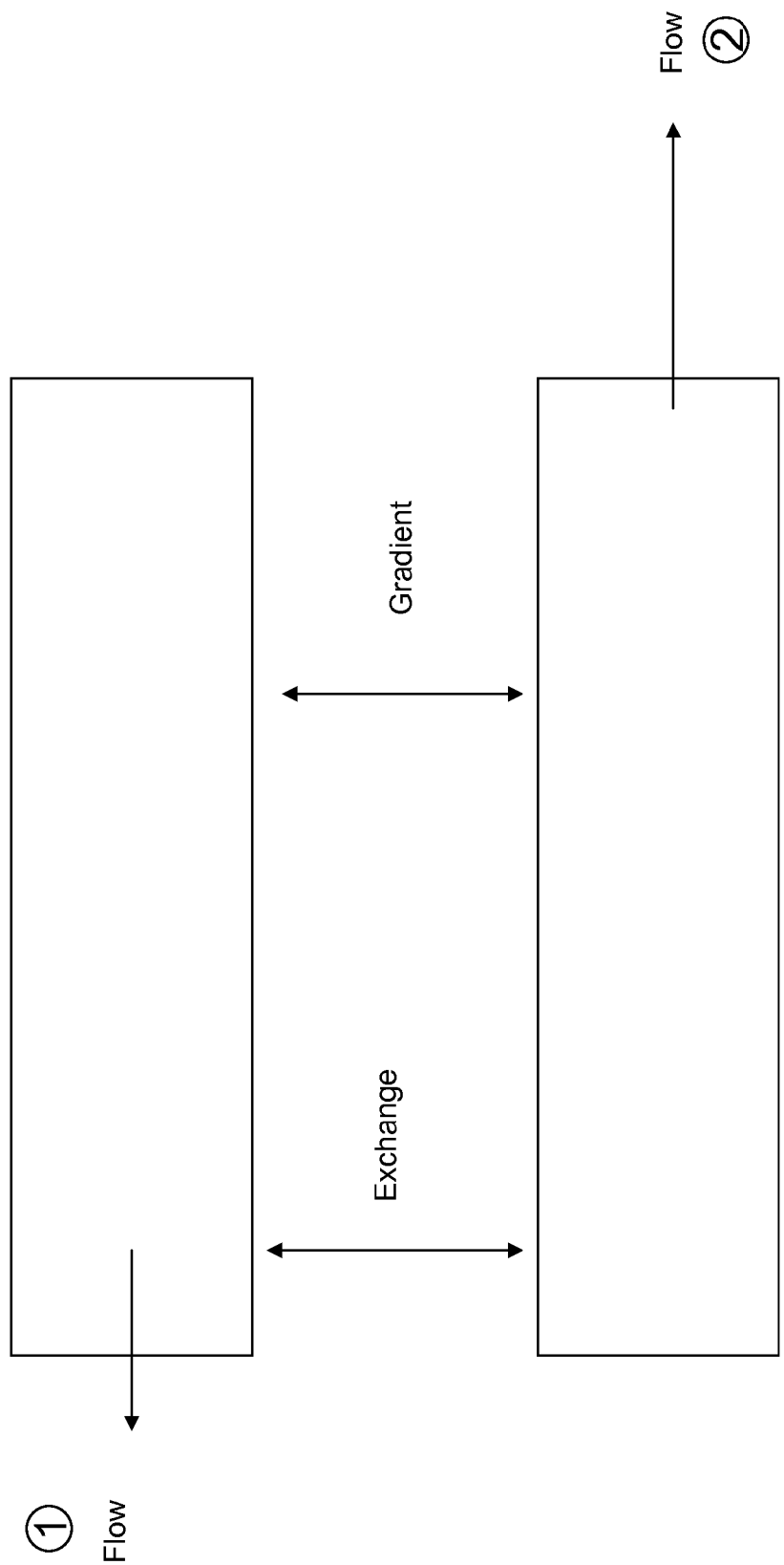
FIG. 14 illustrates a heat exchanger.

FIGS. 11-14 are embodiments of heat exchangers incorporated in the embodiments above and included as heat transfer devices in the definitions above. FIG. 11 is a heat exchanger that has a built in fan(s) that act as a fluid mover to increase flow of supply heat, recovered heat, or waste heat so heat transfer is increased. FIG. 12 are examples of plate heat exchangers. Flow 1 represents a warm fluid and flow 2 represents a cooler fluid that is to be heated by the transfer of heat from fluid 1. FIG. 13 is an example of a shell and tube heat exchanger. In a shell and tube heat exchanger, the hot fluid moves through the shell of the heat exchanger and the gas or liquid to be heated moves through the tubes of the heat exchanger. Lastly, FIG. 14 is a schematic of a regenerative heat exchanger, also known as a countercurrent exchange, a regenerator, or an economizer. Regenerative heat exchangers come in plate or shell and tube forms. In another embodiment (not shown), a heat transfer device may include a condenser as found in a power plant. In yet another embodiment (not shown), heat from another industrial cooling technique is transferred to the body of water with algae in suspension using piping, duct work, and other fluid moving devices. FIGS. 11-14 are not meant to be an exhaustive display of heat exchangers that one skilled in the art may likely use to transfer heat, but only as representative examples of types of heat exchangers that one skilled in the art may use to transfer heat into a heat consuming process or method.

Figure 15:
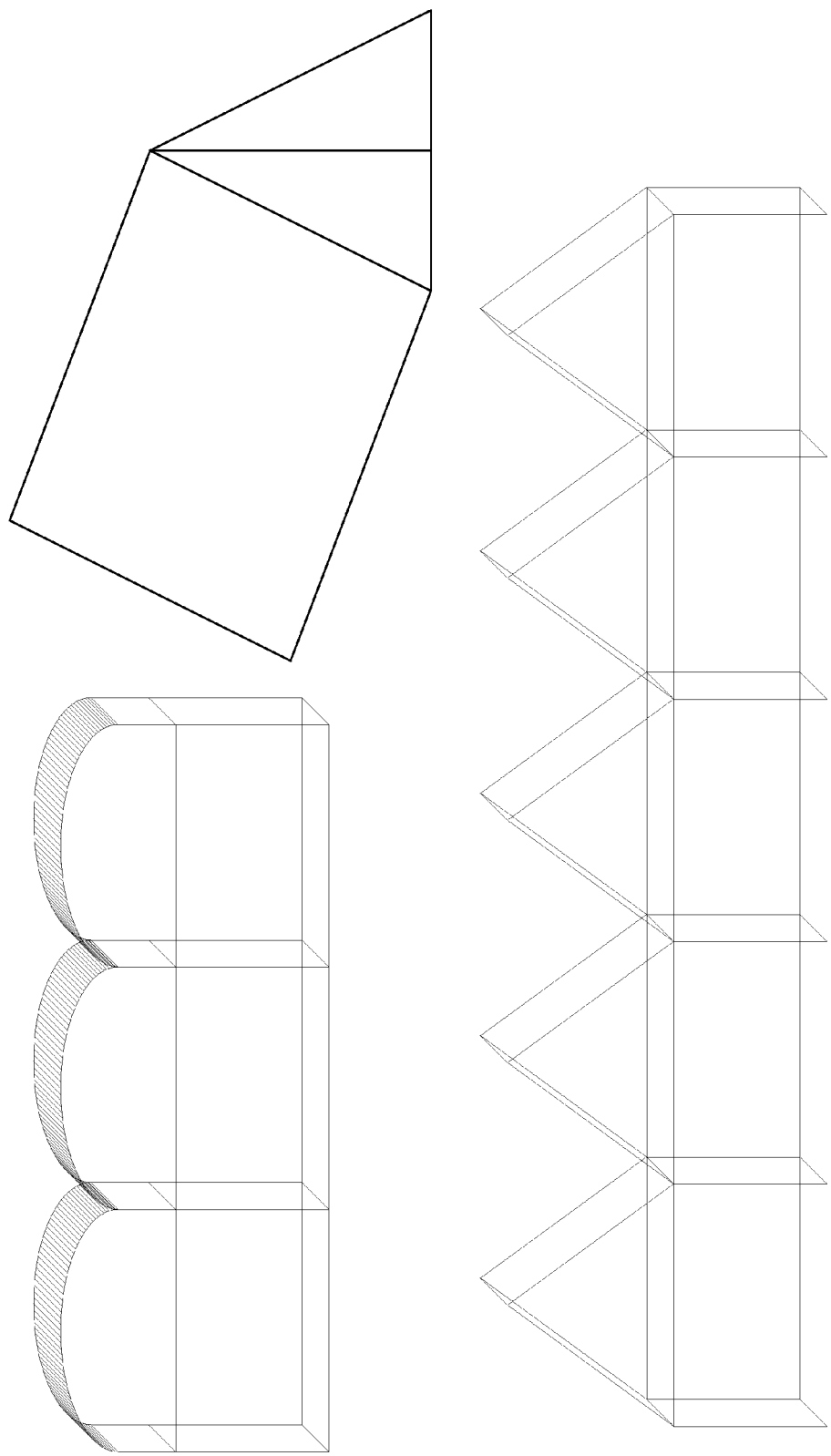
FIG. 15 illustrates covers.
Figure 16:
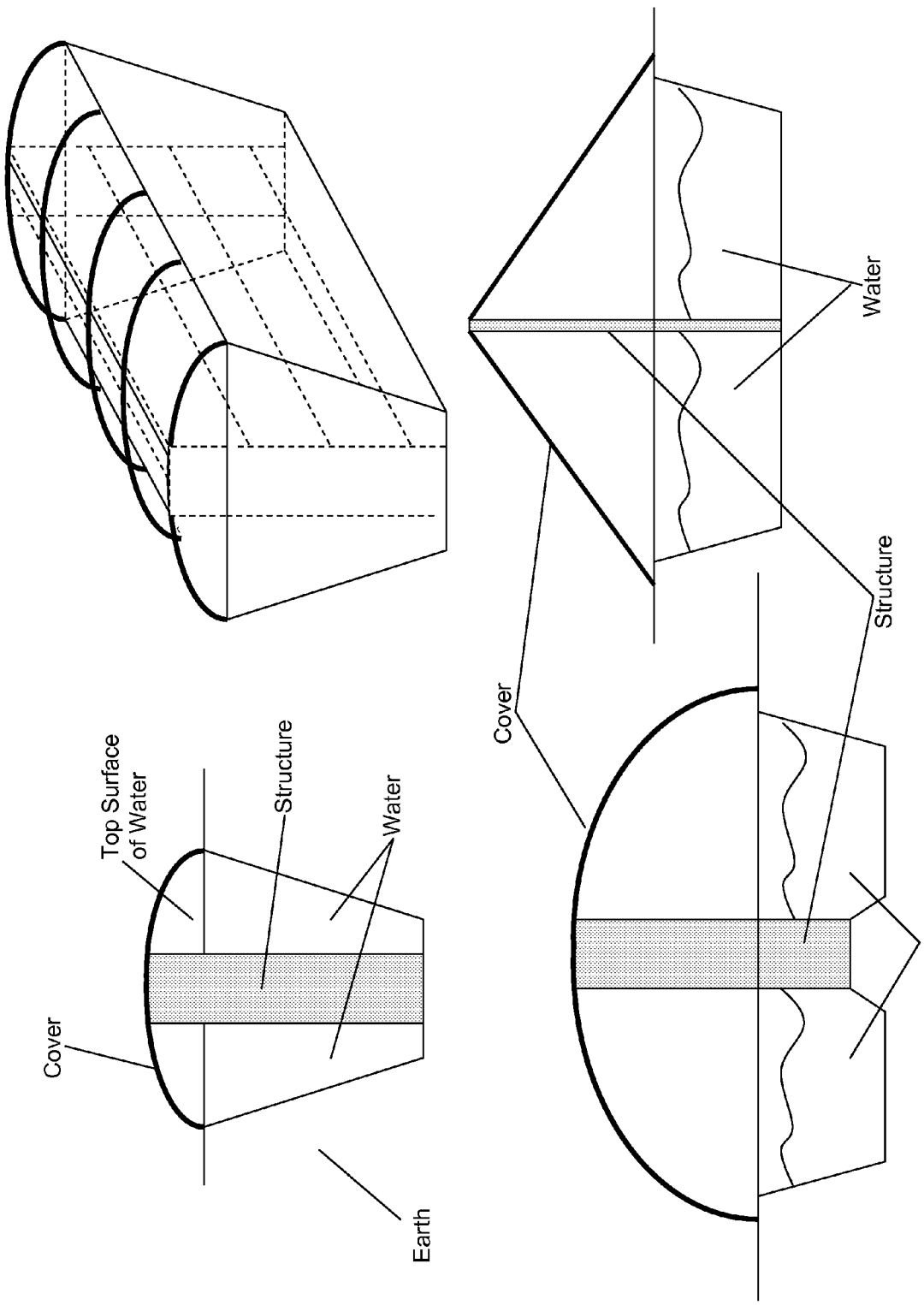
FIG. 16 illustrates a body of water with algae in suspension with a cover.

FIGS. 15-16 are examples of covers that are incorporated in the some of the embodiments above. Covers that may be incorporated in the embodiments above, include one of: gutter connected greenhouse, free standing or round greenhouse, round greenhouse with sides, gothic arch greenhouse, cover without a supporting structure, cover draped over center island divider, covers laid on water surfaces that have periodic floating sections that maintain a space between the cover and the surface of the body of water, covers supported only by a divider structure, and covers supported by a structure that includes a divider, cover supported over a structure, and a cover supported over a divider. In another embodiment (not shown), the cover is supported by at least one of: a structure, divider, and the like. In yet another embodiment (not shown), the support for the cover is partially from one of: a structure and divider. In another embodiment (not shown), the structure that supports the cover is made of at least one: earth, steel, aluminum, metal alloys, plastic, glass, polymeric material, fiberglass, dirt, soil, rock, and the like. The covers may have, at least one of: a support material, strapping, height divider, height structure, support strapping over cover, and support strapping below cover. In another embodiment (not shown), the cover incorporates a structure that allows for a mixer.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative system or method, and illustrative examples shown and described. Accordingly, departures may be made from such details without departing from the spirit or scope of the applicant's general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use.

What is claimed is:

1. A method of producing algae, comprising:
providing at least one open body of water having an algae population in suspension, wherein the open body of water consists of at least one of: a lake, a river, a natural pond, a man-made pond, and a stream;
heating the open body of water with a heat exchanger located in the body of water and connected to a waste heat source, the waste heat source being selected from the group consisting of: a power plant, an industrial process, a cement plant, a kiln, an agricultural product processing plant, a processing plant, an incinerator, a furnace, an oven, an oil refinery, a petrochemical plant, a chemical plant, an ethanol plant, an amine treating plant, a natural gas processing plant, a steel plant, a metals plant, an ammonia plant, a coal gasification plant, a refinery, a liquid synthetic fuel plant, a gas synthetic fuel plant, an industrial plant, and a manufacturing plant;
wherein the heating the open body of water with the heat exchanger comprises moving a fluid from the waste heat source through the heat exchanger, the fluid being selected from the group consisting of: hot gas, hot vapor, and hot liquid;
wherein the fluid from the waste heat source does not come into direct contact with the algae population in suspension in the at least one open body of water; and
growing the algae population.

2. The method of claim 1, wherein the algae population is from a local population, wherein the local population is found within a distance less than or equal to one-hundred and fifty miles from an algae production site.

3. The method of claim 1, further comprising operatively connecting the open body of water with the waste heat source.

4. The method of claim 1, further comprising covering the open body of water with a cover that allows passage of light, wherein the cover is at least partially supported by a support mechanism that comprises a divider, wherein the divider is in the open body of water beneath the cover and supports the cover so the cover is separated from the water by a gap, wherein the body of water remains open.

5. The method of claim 1, wherein the open body of water is not a flow through system.

6. The method of claim 1, wherein the waste heat source further comprises at least one of the following: a heat exchanger located in the industrial process that transfers waste heat from the industrial process to the open body of water and a heat exchanger located in proximity to the industrial process that transfers waste heat from the industrial process to the open body of water.

7. The method of claim 1, further comprising harvesting the algae population and at least partially drying the algae population with the waste heat source.

8. A method of producing algae, comprising:
providing at least one open body of water having an algae population in suspension, wherein the open body of water consists of at least one of: a lake, a river, a natural pond, a man-made pond, and a stream;
providing a liner for the open body of water;
connecting a heat exchanger to a waste heat source;
locating the heat exchanger in the open body of water;
moving a fluid from the waste heat source through the heat exchanger, thereby heating the open body of water; and
growing the algae population, wherein the fluid from the waste heat source does not come into direct contact with the algae population in suspension in the at least one open body of water.

9. The method of claim 8, further comprising:
providing a divider in the open body of water: and
covering the open body of water with a cover that allows passage of light, wherein the cover is above and at least partially supported by the divider such that the cover is separated from the water by a gap.

10. The method of claim 8, wherein the liner consists of a geo-membrane material located along a lower surface of the open body of water.

11. The method of claim 8, wherein the is located along a lower surface of the open body of water and consists of polymeric material.

12. The method of claim 8, wherein the liner is located along a lower surface of the open body of water and is constructed of at least one of: natural rubber and synthetic rubber.

13. The method of claim 8, wherein the liner is located along a lower surface of the open body of water and is constructed of at least one of: fiberglass, cement, crushed stone, sand, clay, soil, and dirt.

14. A method of producing algae, comprising:
providing at least one open body of water having an algae population in suspension, wherein the open body of water contains a bottom surface, side surfaces and a divider, wherein the algae population is from a local population, wherein the local population is found a distance less than one-hundred and fifty miles from the open body of water;
providing a heat exchanger in the open body of water and connected to a waste heat source;
moving a fluid from the waste heat source through the heat exchanger, the fluid being selected from the group consisting of: hot gas, hot vapor, and hot liquid, wherein the fluid from the waste heat source does not come into direct contact with the algae population in suspension in the at least one open body of water;
mixing the open body of water with a plurality of fluid movers to generate a current, wherein the current connects the open body of water with at least one local population found at a distance less than one-hundred and fifty miles from the open body of water;
growing the algae population;
harvesting the algae population; and
at least partially drying the algae population with the waste heat source.

15. The method of claim 14, wherein the algae population includes a genetically modified algae.

16. The method of claim 14, further comprising injecting a carbon dioxide rich exhaust gas source combined with the hot gas directly into the open body of water.

17. The method of claim 14, further comprising covering at least a portion of the open body of water with a cover.

18. The method of claim 14, further comprising:
covering the open body of water with a cover at least partially supported by the divider, wherein the cover has one or more openings, wherein the cover is supported by the divider, wherein the cover is constructed of a material that allows passage of light; and
mixing the divided open body of water with a plurality of fluid movers.

19. The method of claim 18, wherein each of the plurality of fluid movers comprise of: a pump, a mixer, an injector, a nozzle, a damper, and a valve.

20. The method of claim 18, wherein the open body of water includes a liner that lines a lower surface of the open body of water and is constructed of a geo-membrane material.

* * * * *

UNITED STATES PATENT AND TRADEMARK OFFICE
CERTIFICATE OF CORRECTION

| | |
|---|---|
| PATENT NO. | : 7,905,049 B2 |
| APPLICATION NO. | : 11/933743 |
| DATED | : March 15, 2011 |
| INVENTOR(S) | : Ronald A. Erd |

It is certified that error appears in the above-identified patent and that said Letters Patent is hereby corrected as shown below:

Column 15, line 57, claim 8: ... consists of at least --one-- of: a lake, ...

Column 16, line 10, Claim 11: ... method of claim 8, wherein the --liner-- is located ...

Signed and Sealed this
Seventeenth Day of May, 2011

David J. Kappos
*Director of the United States Patent and Trademark Office*